US009896030B2

(12) United States Patent
Sugimoto

(10) Patent No.: US 9,896,030 B2
(45) Date of Patent: Feb. 20, 2018

(54) SYSTEM AND METHOD FOR VEHICLE COLLISION MITIGATION WITH VULNERABLE ROAD USER CONTEXT SENSING

(71) Applicant: Honda Motor Co., Ltd., Tokyo (JP)

(72) Inventor: Yoichi Sugimoto, Novi, MI (US)

(73) Assignee: Honda Motor Co., Ltd., Tokyo (JP)

( * ) Notice: Subject to any disclaimer, the term of this patent is extended or adjusted under 35 U.S.C. 154(b) by 231 days.

(21) Appl. No.: 14/700,223

(22) Filed: Apr. 30, 2015

(65) Prior Publication Data

US 2016/0318445 A1  Nov. 3, 2016

(51) Int. Cl.
| | |
|---|---|
| G06N 7/00 | (2006.01) |
| B60Q 9/00 | (2006.01) |
| G06N 3/00 | (2006.01) |
| B60W 50/14 | (2012.01) |

(Continued)

(52) U.S. Cl.
CPC ............ *B60Q 9/008* (2013.01); *B60W 30/09* (2013.01); *B60W 50/14* (2013.01); *G06F 3/00* (2013.01);

(Continued)

(58) Field of Classification Search
CPC .......... B60Q 9/008; G06K 9/00; G06N 3/006; G08G 1/00

(Continued)

(56) References Cited

U.S. PATENT DOCUMENTS

| | | |
|---|---|---|
| 7,095,336 B2 | 8/2006 | Rodgers et al. |
| 8,253,589 B2 | 8/2012 | Grimm et al. |

(Continued)

FOREIGN PATENT DOCUMENTS

| | | |
|---|---|---|
| DE | 102009035072 | 2/2011 |
| JP | 2009251758 | 10/2009 |

OTHER PUBLICATIONS

Academic Paper: Zhou, Z. et al.: "An Experimental Study of Pedestrian Behavior and Safety Perception", submitted Jul. 31, 2013.

*Primary Examiner* — Omer S Khan
(74) *Attorney, Agent, or Firm* — Rankin, Hill & Clark LLP

(57) ABSTRACT

A system and method for vehicle collision mitigation with vulnerable road user context sensing. The system and method include determining one or more biosignal parameters and one or more physical movement parameters associated with a vulnerable road user (VRU). The system and method also include determining a context of the VRU based on the one or more biosignal parameters and one or more physical movement parameters associated with the VRU. Additionally, the system and method include determining one or more physical movement parameters associated with a vehicle. The system and method further include estimating a probability of collision between the VRU and the vehicle based on the context of the VRU, the one or more physical movement parameters associated with the VRU, and the one or more physical movement parameters associated with the vehicle. The system and method also include providing a human machine interface output response based on the estimation of probability of collision between the VRU and the vehicle, wherein the human machine interface output response is provided on at least one of the following: a head unit of the vehicle, a wearable computing device, and a portable device.

20 Claims, 7 Drawing Sheets

(51) Int. Cl.
*B60W 30/09* (2012.01)
*G06F 3/00* (2006.01)
*G08G 1/005* (2006.01)
*G08G 1/16* (2006.01)
*H04W 4/02* (2018.01)
*G06K 9/00* (2006.01)
*H04L 29/08* (2006.01)

(52) U.S. Cl.
CPC ......... *G06K 9/00805* (2013.01); *G06N 3/006* (2013.01); *G08G 1/005* (2013.01); *G08G 1/166* (2013.01); *H04L 67/12* (2013.01); *H04L 67/18* (2013.01); *H04W 4/02* (2013.01)

(58) Field of Classification Search
USPC ......................................................... 340/435
See application file for complete search history.

(56) References Cited

U.S. PATENT DOCUMENTS

| | | | |
|---|---|---|---|
| 8,547,249 | B2 | 10/2013 | David et al. |
| 2005/0073438 | A1* | 4/2005 | Rodgers ................. G08G 1/166 340/944 |
| 2011/0199199 | A1* | 8/2011 | Perkins ................. B60Q 1/506 340/435 |
| 2011/0246156 | A1 | 10/2011 | Zecha et al. |
| 2013/0058536 | A1 | 3/2013 | Levin et al. |
| 2013/0090881 | A1* | 4/2013 | Janardhanan ........ G01C 22/006 702/104 |
| 2013/0141576 | A1 | 6/2013 | Lord et al. |
| 2016/0093207 | A1* | 3/2016 | Di Censo ............... G08G 1/005 340/944 |

\* cited by examiner

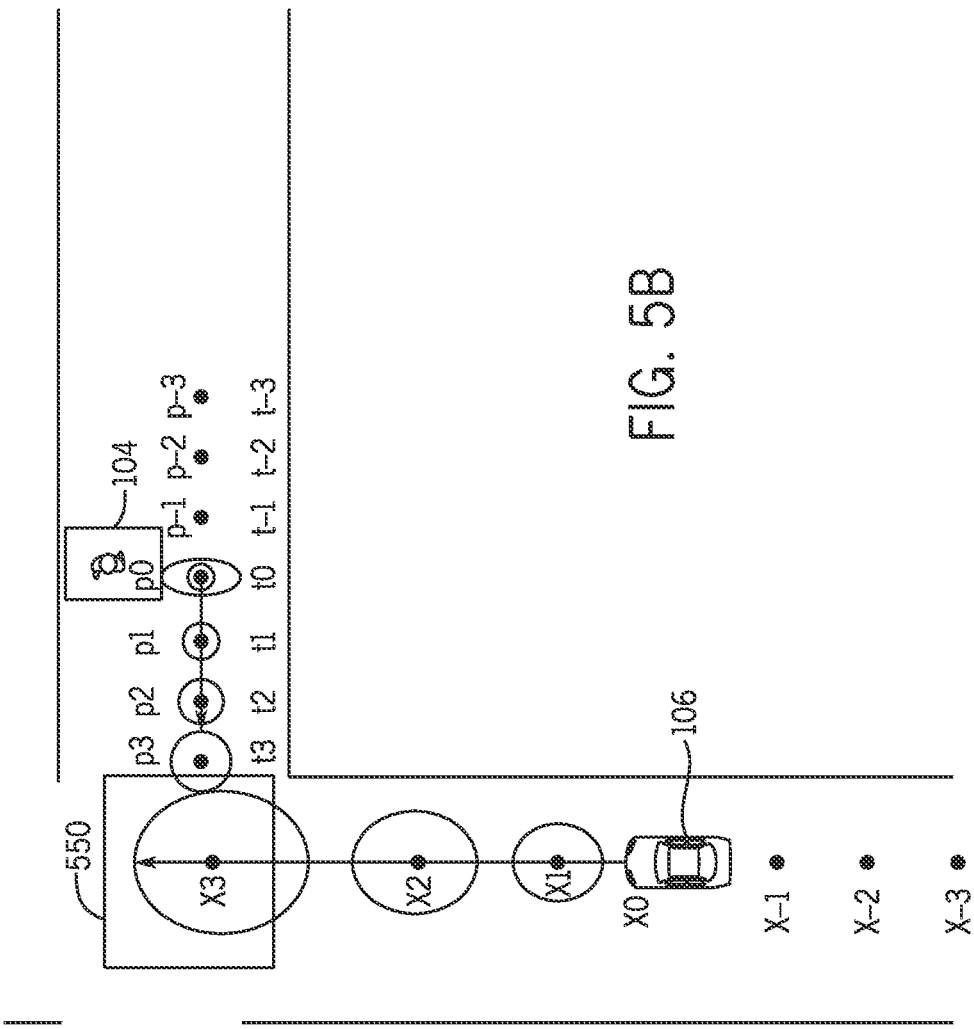

SYSTEM AND METHOD FOR VEHICLE COLLISION MITIGATION WITH VULNERABLE ROAD USER CONTEXT SENSING

BACKGROUND

Wearable computing devices and other portable computers can be integrated across a wide variety of domains and fields for data acquisition. A person that is utilizing a road for purposes other than driving (e.g., walking, running, biking) can be classified as a vulnerable road user. Generally, vulnerable road users are at a greater risk than vehicle occupants succumbing to injury or fatality in an event of a traffic collision with a vehicle. Children and elderly people are particularly vulnerable as having a higher propensity of being involved in a traffic collision as their physical and mental skills are either not fully developed or they are particularly fragile. Vulnerable road users may not be aware of vehicles that are located on the roadway. Additionally, drivers of vehicles may not be aware of vulnerable road users that are located on the roadway. For example, vehicles may be approaching the location in which the vulnerable road user may approach without the driver of the vehicle being aware of the presence of the vulnerable road user, and the vulnerable road user being aware of the presence of the vehicle.

BRIEF DESCRIPTION

According to one aspect, a computer-implemented method for vehicle collision mitigation with vulnerable road user context sensing includes determining one or more biosignal parameters and one or more physical movement parameters associated with a vulnerable road user (VRU). The method also includes determining a context of the VRU based on the one or more biosignal parameters and one or more physical movement parameters associated with the VRU. Additionally, the method includes determining one or more physical movement parameters associated with a vehicle. The method further includes estimating a probability of collision between the VRU and the vehicle based on the context of the VRU, the one or more physical movement parameters associated with the VRU, and the one or more physical movement parameters associated with the vehicle. The method also includes providing a human machine interface output response based on the estimation of probability of collision between the VRU and the vehicle, wherein the human machine interface output response is provided on at least one of the following: a head unit of the vehicle, a wearable computing device, and a portable device.

According to a further aspect, a system for providing vehicle collision mitigation with vulnerable road user context sensing includes a VRU vehicle collision mitigation application that is executed on at least one of: a wearable computing device worn by and/or in possession of a vulnerable road user (VRU), a portable device in possession of the VRU, and a head unit of a vehicle. The wearable computing device includes biosignal sensors and physical signal sensors, the portable device includes physical signal sensors, and the vehicle includes vehicle sensors. The system also includes a VRU bio-movement learning module that is included as a module of the VRU vehicle collision mitigation application that determines one or more biosignal parameters and physical movement parameters associated with the VRU. Additionally, the system includes a VRU context determination module that is included as a module of the VRU vehicle collision mitigation application that determines a context of the VRU based on the one or more biosignal parameters and the physical movement parameters associated with the VRU. The system further includes a vehicle physical movement determination module that is included as a module of the VRU vehicle collision mitigation application that determines one or more physical movement parameters associated with the vehicle. The system also includes a collision probability estimation module that is included as a module of the VRU vehicle collision mitigation application that estimates a probability of collision between the VRU and the vehicle based on the context of the VRU, the one or more physical movement parameters associated with the VRU, and the one or more physical movement parameters associated with the vehicle. In addition, the system includes a HMI control module that is included as a module of the VRU vehicle collision mitigation application that provides a human machine interface output response based on the estimation of probability of collision between the VRU and the vehicle. The human machine interface output response is provided on at least one of the following: the head unit of the vehicle, the wearable device, and the portable device.

According to still another aspect, a computer readable medium including instructions that when executed by a processor executes a method for vehicle collision mitigation with vulnerable road user context sensing that includes determining one or more biosignal parameters and one or more physical movement parameters associated with a vulnerable road user (VRU). The method also includes determining a context of the VRU based on the one or more biosignal parameters and one or more physical movement parameters associated with the VRU. Additionally, the method includes determining one or more physical movement parameters associated with a vehicle. The method further includes estimating a probability of collision between the VRU and the vehicle based on the context of the VRU, the one or more physical movement parameters associated with the VRU, and the one or more physical movement parameters associated with the vehicle. The method also includes providing a human machine interface output response based on the estimation of probability of collision between the VRU and the vehicle, wherein the human machine interface output response is provided on at least one of the following: a head unit of the vehicle, a wearable computing device, and a portable device.

BRIEF DESCRIPTION OF THE DRAWINGS

FIG. 5B is an illustrative example of estimating an overlap between an expected path of the vulnerable road user and an expected path of the vehicle based on the process flow diagram of FIG. 5A according to an exemplary embodiment.

DETAILED DESCRIPTION

Figure 1:
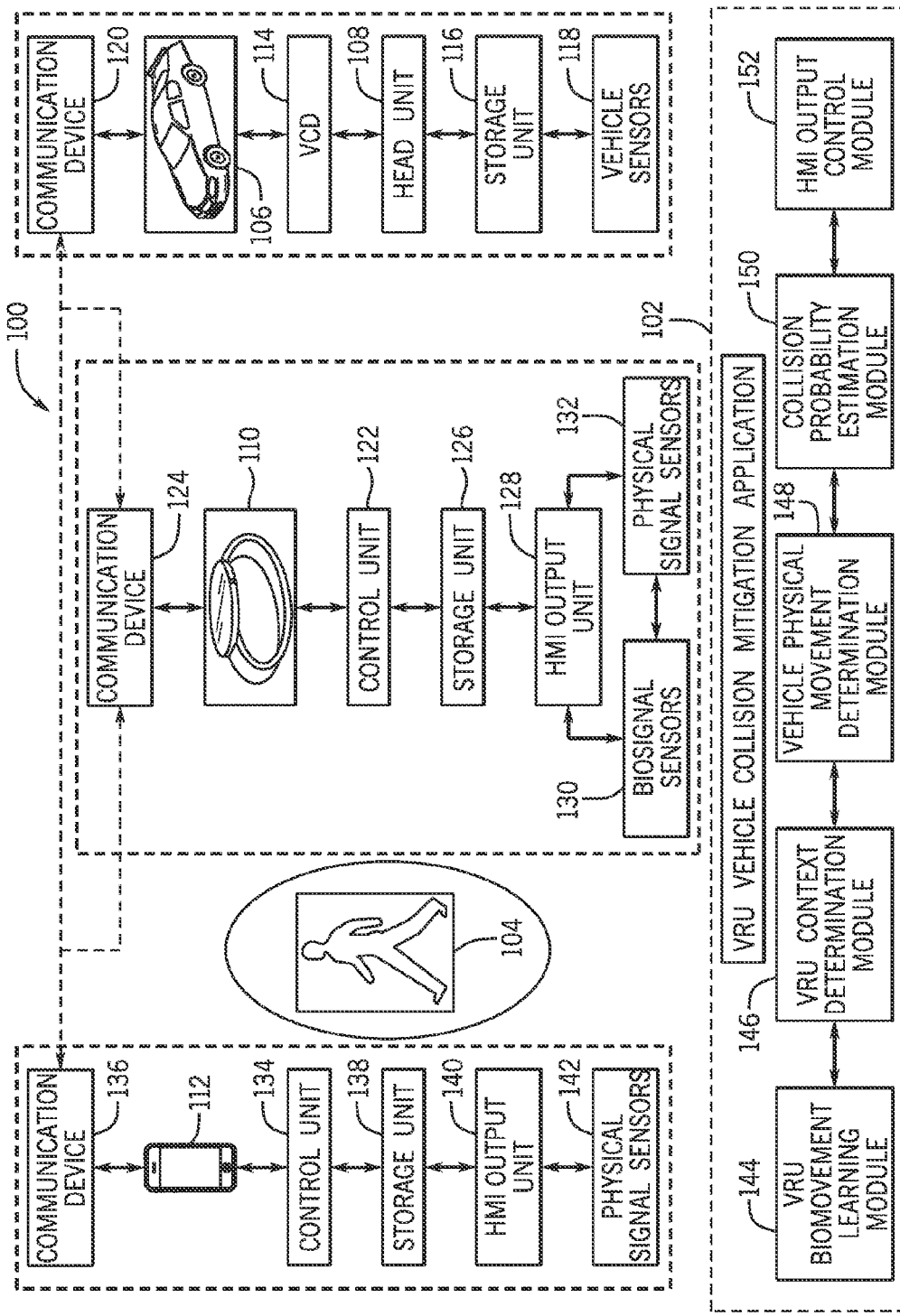
FIG. 1 is a schematic view of an operating environment for implementing systems and methods for vehicle collision mitigation with vulnerable road user context sensing according to an exemplary embodiment.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database", as used herein can refer to table, a set of tables, a set of data stores and/or methods for accessing and/or manipulating those data stores. Some databases can be incorporated with a disk as defined above.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers. In some embodiments, a "portable device" could refer to a remote device that includes a processor for computing and/or a communication interface for receiving and transmitting data remotely.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "vehicle system", as used herein can include, but is not limited to, any automatic or manual systems that can be used to enhance the vehicle, driving and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, among others.

A "wearable computing device", as used herein can include, but is not limited to, a computing device component (e.g., a processor) with circuitry that can be worn by and/or in possession of a user. In other words, a wearable computing device is a computer that is subsumed into the personal space of a user. Wearable computing devices can include a display and can include various sensors for sensing and determining various parameters associated with a user. For example, location, motion, and biosignal (physiological) parameters, among others. Some wearable computing devices have user input and output functionality. Exemplary wearable computing devices can include, but are not limited to, watches, glasses, clothing, gloves, hats, shirts, jewelry, rings, earrings necklaces, armbands, shoes, earbuds, headphones and personal wellness devices.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an operating environment 100 for implementing systems and methods for vehicle collision mitigation with vulnerable road user context sensing according to an exemplary embodiment. The components of environment 100, as well as the components of other systems, hardware architectures, and software architectures discussed herein, can be combined, omitted, or organized into different architectures for various embodiments.

Generally, the environment 100 includes a vulnerable road user vehicle collision mitigation application (VVCM application) 102 that is utilized to predict behaviors (e.g., path of travel, rate of travel, overlap between travel paths) of a vulnerable road user (VRU) 104 and a vehicle 106. The VVCM application 102 predicts the behaviors of the VRU 104 and the vehicle 106 in order to warn the VRU 104 and a driver (not shown) of the vehicle 106 of a probability of collision between the VRU 104 and the vehicle 106.

As described in more detail below, the VVCM application 102 can be executed on a head unit 108 of the vehicle 106, a wearable computing device 110 worn by and/or in possession of the VRU 104, a portable device 112 in possession of the VRU 104, and/or on an externally hosted computing infrastructure (not shown) that is accessed by the head unit 108, the wearable computing device 110, and/or the portable device 112. Additionally, the VVCM application 102 can utilize components of the vehicle 106, the wearable computing device 110 worn and/or in possession of the VRU 104, and the portable device 112 in possession of the VRU 104.

In the illustrated embodiment of FIG. 1, the vehicle 106 can include a vehicle computing device 114 (VCD) with provisions for processing, communicating and interacting with various components of the vehicle 106 and other components of the environment 100. In one embodiment, the VCD 114 can be implemented on the head unit 108, a navigation unit (not shown), an infotainment unit (not shown), an electronic control unit (not shown), among others. Generally, the VCD 114 includes a processor (not shown), a memory (not shown), a disk (not shown), and an input/output (I/O) interface (not shown), which are each operably connected for computer communication via a bus (not shown). The I/O interface provides software and hardware to facilitate data input and output between the components of the VCD 114 and other components, networks, and data sources, of the environment 100. In some embodiments, the VCD 114 can control one or more vehicle systems and/or functions (e.g., engine control unit, acceleration, braking, etc.) to provide a collision avoidance capability. Specifically, as discussed below, the VCD 114 can control the engine control unit (not shown) and/or the braking system to decelerate the speed of the vehicle 106 or stop the vehicle 106 based on an estimated probability of collision between the vehicle 106 and the VRU 104.

The VCD 114 is also operably connected for computer communication (e.g., via the bus and/or the I/O interface) to the head unit 108. The head unit 108 can be connected to one or more display devices (not shown) (e.g., display screens), audio devices (not shown) (e.g., audio system, speakers), and haptic devices (not shown) (e.g., haptic steering wheel) that are utilized to provide a human machine interface (not shown) (HMI) to provide a driver of the vehicle 106 with various types of information. Such information can include, but is not limited to, safety warnings that are presented to the driver of the vehicle 106 to alert the driver of possible safety issues. Specifically, as discussed in more detail, the HMI can be presented by the head unit 108 via the display devices, audio devices, and/or haptic devices to provide warnings to the driver that are controlled by the VVCM 102 application based on the propensity and intensity of the predicted collision between the vehicle 106 and the VRU 104.

In some embodiments, the head unit 108 can include a storage unit 116. In alternate embodiments, the storage unit 116 can be included as a stand alone component of the vehicle 106. The storage unit 116 can store one or more operating systems, applications, associated operating system data, application data, vehicle system and subsystem user interface data, and the like that are executed by the VCD 114 and/or the head unit 108. As will be discussed in more detail below, the storage unit 116 can be utilized by the VVCM application 102 to store one or more physical movement parameters that are associated with the vehicle 106 that are collected during a VRU context learning phase of the VVCM application 102.

The vehicle 106 can additionally include vehicle sensors 118 that can sense and provide the one or more physical movement parameters that are associated with the vehicle 106 to be used by the VVCM application 102. It is understood that the vehicle sensors 118 can include, but are not limited to, sensors associated with the vehicle systems and other sensors associated with the vehicle 106. Specific vehicle sensors 118 can include, but are not limited to, vehicle speed sensors, vehicle acceleration sensors, vehicle angular velocity sensors, accelerator pedal sensors, brake sensors, steering wheel angle sensors, vehicle locational sensors (e.g., GPS), vehicle directional sensors (e.g., vehicle compass), throttle position sensors, wheel sensors, anti-lock brake sensors, camshaft sensors, among others. Other vehicle sensors 118 can include, but are not limited to, cameras mounted to the interior or exterior of the vehicle 106, radar and laser sensors mounted to the exterior of the vehicle 106, etc. It is understood that the sensors can be any type of sensor, for example, acoustic, electric, environmental, optical, imaging, light, pressure, force, thermal, temperature, proximity, among others.

In an exemplary embodiment, the vehicle sensors 118 are operable to sense a measurement of data associated with the physical movement of the vehicle 106 that includes, but is not limited to, a positional location (e.g., GNSS position) of the vehicle 106, an angular velocity and acceleration (hereinafter referred to as velocity) (e.g., real-time speed) of the vehicle 106, and a directional orientation (e.g., heading) of the vehicle 106. The vehicle sensors 118 can provide the measurement of data associated with the physical movement of the vehicle 106 in the form of one or more data signals to the head unit 108, the wearable computing device 110, and/or the portable device 112. These data signals can be converted into one or more physical movement parameters associated with the vehicle 106 that can be provided to the VVCM application 102. The physical movement parameters associated with the vehicle 106 can also be provided to vehicle systems and/or the VCD 114 to generate other data metrics and parameters.

The vehicle 106 can additionally include a communications device 120 that can communicate with one or more components of the operating environment 100 and/or additional systems and components outside of the operating environment 100. The communication device 120 of the vehicle 106 can include, but is not limited to, one or more transceivers (not shown), one or more receivers (not shown), one or more transmitters (not shown), one or more antennas (not shown), and additional components (not shown) that can be utilized for wired and wireless computer connections and communications via various protocols, as discussed in detail above. For example, the communication device 120 can use a dedicated short range communication protocol (DSRC) that can be used to provide data transfer to send/receive electronic signals with the wearable computing device 110 and/or the portable device 112 to be utilized by the VVCM application 102 over a respective vehicle to VRU communication network. The communication protocol can include, but is not limited to existing DSRC protocols, Wi-Fi, Bluetooth, etc.

As mentioned above, the operating environment 100 also includes the wearable computing device 110 that can be worn by and/or in possession of the VRU 104 for sensing one or more parameters associated with the VRU 104. The one or more parameters associated with the VRU 104 that can be sensed by the wearable computing device 110 can include, but are not limited to, one or more biosignals parameters (e.g., physiological data) associated with the VRU 104 and one or more physical movement parameters associated with the VRU 104 (e.g., velocity, directional location, positional location).

It is understood that the wearable computing device 110 can include a control unit 122 (e.g., a processor) with circuitry that can be worn by and/or in possession of the VRU 104. The control unit 122 can process and compute functions associated with the components of the wearable computing device 110. The wearable computing device 110 can additionally include a communication device 124 that can communicate with one or more components of the operating environment 100 and/or additional systems and components outside of the operating environment 100. The communication device 124 of the wearable computing device 110 can include, but is not limited to, one or more transceivers (not shown), one or more receivers (not shown), one or more transmitters (not shown), one or more antennas (not shown), and additional components (not shown) that can be used for wired and wireless computer connections and communications via various protocols, as discussed in detail above.

The communications device 124 can be additionally used by one or more components of the wearable computing device 110 to communicate with components that are residing externally from the wearable computing device 110. For example, the control unit 122 can utilize the communication device 124 to access the portable device 112, the head unit 108, and/or the external computing infrastructure in order to execute one or more externally hosted applications, including the VVCM application 102. In one or more embodiments, the wearable computing device 110 can generally provide data to the head unit 108 of the vehicle 106 and/or the portable device 112, the data being associated with the VRU 104 wearing the wearable computing device 110. For example, the communication device 124 can use DSRC that can be used to provide data transfer to send/receive electronic signals with the vehicle 106 and/or the portable device 112 to be utilized by the VVCM application 102 over the respective vehicle to VRU communication network. The communication protocol can include, but is not limited to existing DSRC protocols, Wi-Fi, Bluetooth, etc.

The wearable computing device 110 can additionally include a storage unit 126. The storage unit 126 can store one or more operating systems, applications, associated operating system data, application data, and the like that are executed by the control unit 122. As will be discussed in more detail below, the storage unit 126 can be accessed by the VVCM application 102 to store the one or more biosignal parameters and one or more physical movement parameters associated with to the VRU 104 that are collected during the VRU context learning phase of the VVCM application 102.

The wearable computing device 110 also includes a HMI output unit 128 that can be capable of providing one or more HMI outputs to the VRU 104. The HMI output unit 128 can include, but is not limited to, one or more visual devices (e.g., display screens), one or more audio devices (e.g., speakers), and/or one or more haptic devices (e.g., tactile electronic displays). The HMI output unit 128 can provide the VRU 104 with various types of information. Such information can include, but is not limited to, safety warnings that are presented to the VRU 104 when one or more applications are executed on the wearable computing device 110. Specifically, as will be discussed in more detail, the HMI can be presented by the HMI output unit 128 to provide warnings to the VRU 104 based on an estimated probability of collision between the VRU 104 and the vehicle 106 as provided by VVCM application 102.

The wearable device 110 can include biosignal sensors 130 for sensing and determining one or more biosignal parameters associated with the VRU 104. In one embodiment, the biosignal sensors 130 can sense physiological data and other data associated with the body and biological system of the VRU 104. As discussed in more detail below, the biosignal sensors 130 can provide one or more sensed VRU biosignal parameters associated with the VRU 104 to be evaluated by one or more components of the VVCM application 102. The one or more VRU biosignal parameters can include, but are not limited to, heart information, such as, heart rate, heart rate pattern, blood pressure, oxygen content, etc., brain information, such as, electroencephalogram (EEG) measurements, functional near infrared spectroscopy (fNIRS), functional magnetic resonance imaging (fMRI), etc., digestion information, respiration rate information, salivation information, perspiration information, pupil dilation information, body temperature, muscle strain, as well as other kinds of information related to the autonomic nervous system or other biological systems of the VRU 104. In some embodiments, the one or more VRU biosignal parameters can additionally include behavioral information, for example, mouth movements, facial movements, facial recognition, head movements, body movements, hand postures, hand placement, body posture, gesture recognition, among others.

In additional embodiments, the one or more biosignal parameters can be collected and provided to the vehicle 106 and/or the portable device 112 to be stored respectively. As described in more detail below, the VVCM application 102 can access the one or more of the biosignal parameters to determine a plurality of exercise threshold values associated with the VRU 104. The VRU's exercise threshold value(s) can include a value(s) that are determined based on one or more VRU biosignal parameters that are collected and stored on the storage unit 126 of the wearable computing device 110 over the VRU context learning phase of the VVCM application 102. As will be described, during an execution phase of the VVCM 102 application, one or more of the VRU biosignal parameters can be collected in real time in order to partially determine a context of the VRU 104 (e.g., a description of the VRU as he/she is using the road).

In addition to the one or more biosignal sensors 130, the wearable computing device 110 can additionally include one or more physical signal sensors 132. The one or more physical signal sensors 132 can include, but are not limited to, an accelerometer, a magnetometer, a gyroscope, an ambient light sensor, a proximity sensor, a locational sensor (e.g., GPS), a positional sensor, a directional sensor (e.g., compass), and the like. Additionally, the one or more physical signal sensors 132 can include one or more cameras that can be accessed by the one or more applications executed and/or accessed on the wearable computing device 110.

In an exemplary embodiment, the one or more physical signal sensors 132 can provide one or more physical movement parameters associated with the VRU 104 to be evaluated by one or more components of the VVCM application 102. As will be described in more detail below, the VVCM application 102 can extract velocity data from the one or more physical movement parameters associated with the VRU 104. During a predetermined period of time, the physical movement parameters can be collected and stored on the storage unit 126 until the VVCM application 102 can create velocity thresholds that are associated with the VRU 104. In additional embodiments, the one or more VRU physical parameters can be collected and provided to the vehicle 106 and/or the portable device 112 to be stored on one or more of the respective storage units 116, 128. During the execution phase, the VVCM application 102 can receive the one or more physical movement parameters associated with the VRU 104 (in real time) to determine the velocity of the VRU 104. The velocity of the VRU 104 is then compared to the one or more of the VRU's velocity threshold values in order to partially determine the context of the VRU 104.

As mentioned above, the operating environment 100 also includes the portable device 112 that can be in possession of the VRU 104 to be utilized (e.g., used or held) by the VRU 104 for executing and/or accessing one or more applications, web interfaces, and/or sensing one or more physical movement parameters associated with the VRU 104. The one or more physical movement parameters associated with the VRU 104 that can be sensed by the portable device 112 can include, but are not limited to, the velocity of the VRU 104 as he/she is moving, a positional location of the VRU 104, and a directional location of the VRU 104 (e.g., the heading of the VRU 104 as he/she is moving).

It is understood that the portable device 112 can include a control unit 134 (e.g., a processor) with circuitry. The control unit 134 can process and compute functions associated with the components of the portable device 112. The portable device 112 can additionally include a communication device 136 that can communicate with one or more components of the operating environment 100 and/or additional systems and components outside of the operating environment 100. The communication device 136 can include, but is not limited to, one or more transceivers (not shown), one or more receivers (not shown), one or more transmitters (not shown), one or more antennas (not shown), and additional components (not shown) that can be utilized for wired and wireless computer connections and communications via various protocols, as discussed in detail above.

The communications device 136 can be utilized by one or more components of the portable device 112 to communicate with components that are residing externally from the wearable computing device 110. In one embodiment, the control unit 134 can utilize the communication device 136 to access the wearable computing device 110, the head unit 108, and/or external infrastructure in order to execute one or more externally hosted applications, including the VVCM application 102. In one or more embodiments, the portable device 112 can generally provide data to the head unit 108 of the vehicle 106 and/or the wearable computing device 110, the data being associated with the VRU 104 in possession of the portable device 112. For example, the communication device 136 can communicate via DSRC to transfer data and send/receive electronic signals with the wearable computing device 110 and/or the vehicle 106 to be utilized by the VVCM application 102 over the respective vehicle to VRU communication network. The communication protocol can include, but is not limited to existing DSRC protocols, Wi-Fi, Bluetooth, etc.

The storage unit 138 can be utilized to store one or more operating systems, applications, associated operating system data, application data, and the like that are executed by the control unit 134. As will be discussed in more detail below, the storage unit 138 can be utilized by the VVCM application 102 to store one or more physical movement parameters associated with the VRU 104 that is collected during a predetermined amount of time.

In one or more embodiments, the storage unit 138 can include profile data associated with the VRU 104 that is accessed by one or more applications that are executed on the portable device 112. For example, profile data can be input by the VRU 104 or a third party associated with the VRU 104 and stored as a user profile within the storage unit 138. Such profile data can be created during an initial setup of the portable device 112 and can include, but is not limited to, the user's age, gender, and/or other demographic information. As described in more detail below, the VVCM application 102 can access the profile data from the storage unit 138 as a factor in estimating the probability of collision between the VRU 104 and the vehicle 106.

The portable device 112 also includes a HMI output unit 140 that can be capable of providing one or more HMI outputs to the VRU 104. The HMI output unit 140 can include, but is not limited to, one or more visual devices (e.g., display screens), one or more audio devices (e.g., speakers), and/or one or more haptic devices (e.g., tactile electronic displays). The HMI output unit 140 can provide the VRU 104 with various types of information. Such information can include, but is not limited to, safety warnings that are presented to the VRU 104 when one or more applications are executed on the portable device 112. Specifically, as discussed in more detail, HMI output unit 140 can provide warnings to the VRU 104 that are controlled by the VVCM application 102 based on the probability of collision between the VRU 104 and the vehicle 106.

The portable device 112 can additionally include one or more physical signal sensors 142. The one or more physical signal sensors 142 can include, but are not limited to, an accelerometer, a magnetometer, a gyroscope, an ambient light sensor, a proximity sensor, a locational sensor (e.g., GPS), a positional sensor, a directional sensor (e.g., compass), and the like. Additionally, the one or more physical signal sensors 142 can include one or more cameras that can be accessed by the one or more applications executed and/or accessed on the portable device 112.

As will be discussed in more detail herein, in an exemplary embodiment, the one or more physical signal sensors 142 can provide the one or more physical movement parameters associated with the VRU 104 to be evaluated by one or more components of the VVCM application 102. In one embodiment, if the VRU 104 is wearing and/or possessing the wearable computing device 110 and is possessing the portable device 112, the VVCM application 102 can aggregate the physical movement parameters associated with the VRU 104 provided by the wearable computing device 110 and the portable device 112. The VVCM application 102 can extract velocity data from the aggregated physical movement parameters associated with the VRU 104 in order to determine the VRU's velocity threshold values. In another embodiment, the VVCM application 102 can extract velocity data from the one or more physical movement parameters associated with the VRU 104 provided by the portable device 112 independently from the physical movement parameters associated with the VRU 104 provided by the wearable computing device 110 in order for the VVCM application 102 to create the VRU's velocity thresholds.

II. The VVCM Application and Related Methods

The components of the VVCM application 102 will now be described according to an exemplary embodiment and with reference to FIG. 1. In an exemplary embodiment, the VVCM application 102 can be stored on one or more of the storage units 116, 126, 138 and executed by one or more of the head unit 108 of the vehicle 106, the wearable computing device 110, and/or the portable computing device 112. In another embodiment, the VVCM application 102 can be stored on the externally hosted computing infrastructure and can be accessed by the communication devices 120, 124, 136 to be executed by the head unit 108 of the vehicle 106, the wearable computing device 110, and/or the portable computing device 112.

In an exemplary embodiment, upon an initial execution of the VVCM application 102 by the VRU 104 via the wearable computing device 110 and/or the portable device 112, a VRU contextual learning phase of the application 102 is initiated to evaluate one or more of the VRU's biosignal parameters and physical movement parameters associated with the VRU 104 in order to create a context for the VRU 104. The context of the VRU 104 can include a designation of the VRU's usage of the road (e.g., walking, running, biking, passenger). Upon completion of the VRU contextual learning phase of the application 102, the VVCM application 102 can initiate an execution phase. During the execution phase of the application 102, the context of the VRU 104, physical movement parameters associated with the VRU 104 captured in real time, the physical movement parameters associated with the vehicle 106 captured in real time, and additional collision probability factors can be utilized to estimate a probability of collision between the VRU 104 and the vehicle 106.

The VVCM application 102 can include a VRU bio-movement learning module 144, a VRU context determination module 146, a vehicle physical movement determination module 148, a collision probability estimation module 150, and a HMI output control module 152. Methods related to one or more processes that are executed by the modules 144-152 of the VVCM application 102 will also be described with reference to FIGS. 2-6.

Figure 2:
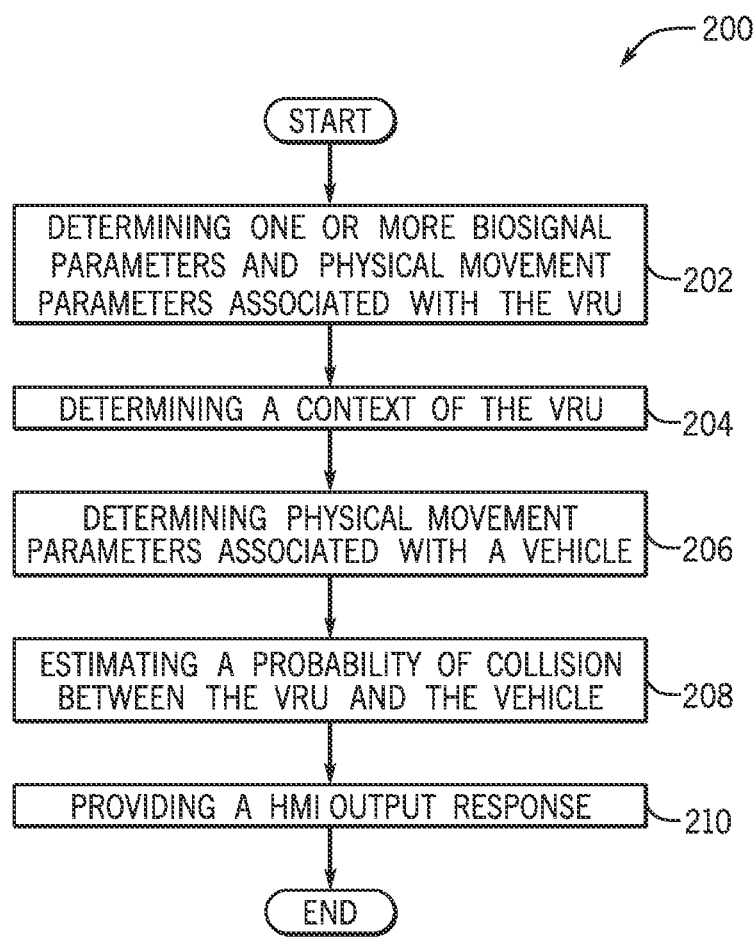
FIG. 2 is a process flow diagram of a method for vehicle collision mitigation with vulnerable road user context sensing utilized by the VRU vehicle collision application from the operating environment of FIG. 1 according to an exemplary embodiment.

FIG. 2 is a process flow diagram of a method 200 for vehicle collision mitigation with vulnerable road user context sensing executed by the VVCM application 102 from the operating environment of FIG. 1 according to an exemplary embodiment. FIG. 2 will be described with reference to the components of FIG. 1, though it is to be appreciated that the method of FIG. 2 can be used with other systems/components. At block 202, the method includes determining one or more biosignal parameters and physical movement parameters associated with the VRU 104.

In an exemplary embodiment, the VRU bio-movement learning module 144 can determine one or more biosignal parameters and physical movement parameters associated with the VRU 104 within the VRU contextual learning phase of the VVCM application 102. Specifically, the VRU bio-movement learning module 144 can determine the exercise threshold values and velocity threshold values associated with the VRU 104. As described below, within the execution phase of the application 102, the exercise threshold value(s) and velocity threshold value(s) are utilized by the application 102 to classify the context of the VRU 104.

Specifically, the bio-movement learning module 340 can analyze the one or more biosignal parameters associated with the VRU 104 provided by the biosignal sensors 130 over the course of the VRU contextual learning phase of the application 102 in order to determine the exercise threshold values associated with the VRU 104. The exercise threshold values can include values that categorize one or more types of activities by a subset of one or more biosignal parameter ranges associated with the VRU 104. In one embodiment, the exercise threshold values can include, but are not limited to, a resting exercise threshold value(s), an active exercise threshold value(s), and a hyperactive exercise threshold value(s). However, other types of exercise threshold values will be apparent.

Additionally, the bio-movement learning module 144 can analyze one or more physical movement parameters associated with the VRU 104 as provided by the physical signal sensors 132 of the wearable computing device 110 and/or the physical signal sensors 142 of the portable device 112 over the course of the VRU contextual learning phase of the application 102. The physical movement parameters associated with the VRU 104 can be analyzed over the course of the VRU contextual learning phase of the application 102 in order to determine a plurality of velocity threshold values that pertain to the VRU 104. The velocity threshold values can include values that categorize one or more ranges of velocity by a subset of one or more physical parameter ranges associated with the VRU 104. The velocity threshold values can include, but are not limited to, a resting velocity threshold value, a walking velocity threshold value, and a running velocity threshold value.

The exercise threshold values are specific to each VRU 104 since they account for the VRU's biosignal parameter(s) at specific velocities. For instance, an older VRU 104 may have a higher heart rate during walking, than a younger VRU 104. The velocity threshold values are specific to each VRU 104 since they account for the VRU's average low velocity, medium velocity, and high velocity over the course of the contextual learning phase of the application 102. For instance, an older VRU 104 may have a slower average high velocity than a younger VRU 104. Therefore, the velocity threshold values ensure that each VRU's physical movement parameters are measured with respect to his/her velocity of movement.

Figure 3:
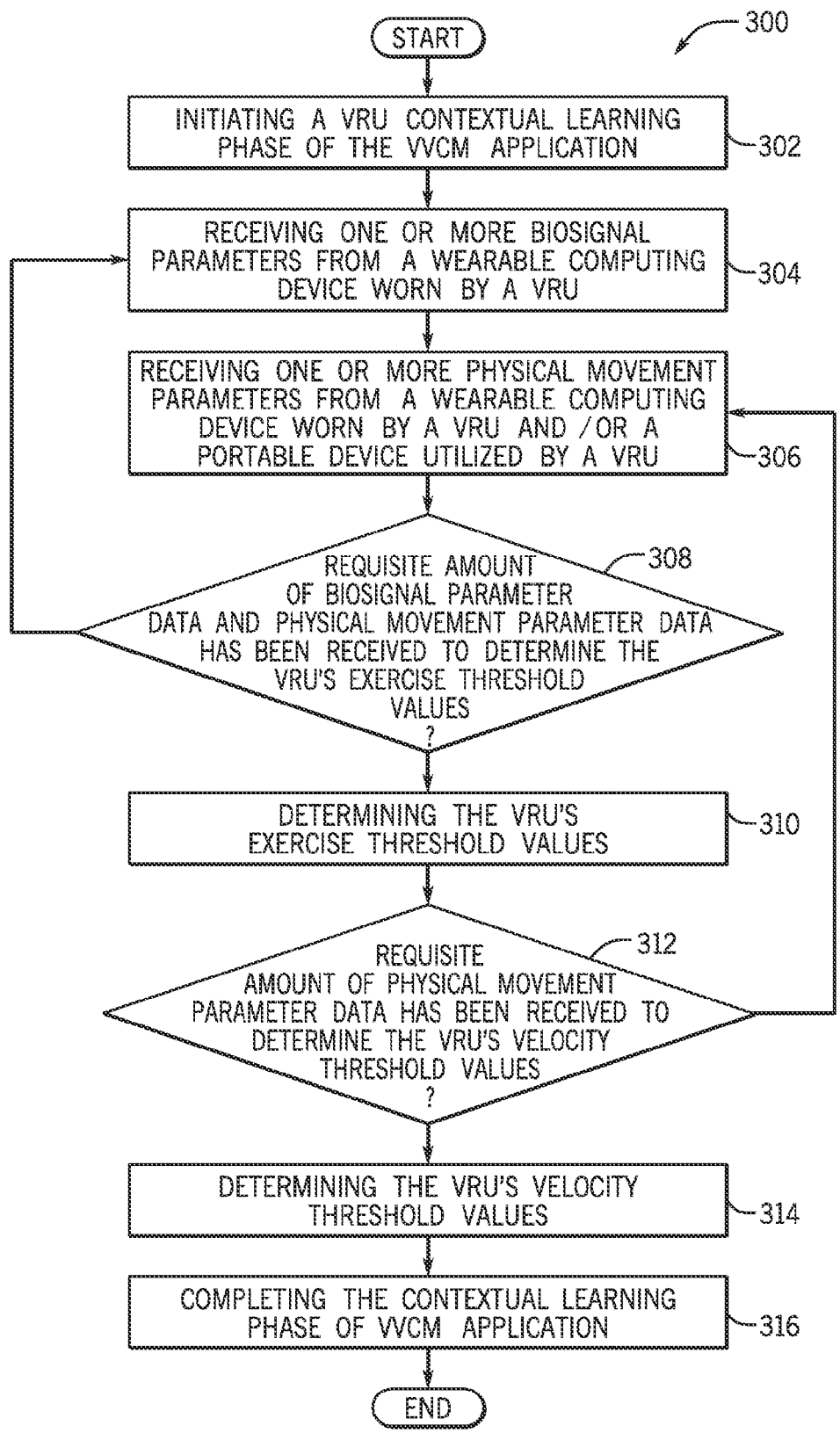
FIG. 3 is a process flow diagram of a method for determining exercise threshold values and velocity threshold values of a vulnerable road user during a VRU contextual learning phase of the VRU vehicle collision application from the operating environment of FIG. 1 according to an exemplary embodiment.

Referring now to FIG. 3, a process flow diagram of a method 300 for determining exercise threshold values and velocity threshold values of a VRU 104 during a VRU contextual learning phase of the VVCM application 102 from the operating environment of FIG. 1 according to an exemplary embodiment. FIG. 3 will be described with reference to the components of FIG. 1, though it is to be appreciated that the method of FIG. 3 can be used with other systems/components. At block 302, the method includes initiating a VRU contextual learning phase of the VVCM application 102.

At block 304, the method includes receiving one or more biosignal parameters from a wearable computing device 110 worn and/or in possession of a VRU 104. In one embodiment, the VRU bio-movement learning module 144 can access the one or more biosignal sensors 130 of the wearable computing device 110 to retrieve one or more biosignal parameters that are associated with the VRU 104. As an illustrative example, the VRU bio-movement learning module 144 can receive a heart rate of the VRU 104 as a biosignal parameter from the wearable computing device 110 associated with the VRU 104. In some embodiments, the wearable computing device 110 is configured to transmit the one or more biosignal parameters at a predetermined time interval. In other embodiments, the bio-movement learning module 144 can access the biosignal sensors 130 (locally or via the communication device 124) to supply one or more biosignal parameters at the predetermined time interval. An exemplary predetermined time interval can be 50 ms at a frequency of about 20 Hz. In an exemplary embodiment, upon receiving the one or more biosignal parameters, the VRU bio-movement learning module 144 can store the one or more biosignal parameters received from the biosignal sensors 130 within the storage unit 126 of the wearable computing device 110 and/or the storage unit 138 of the portable device 112 during the course of the VRU contextual learning phase of the application 102.

At block 306, the method includes receiving one or more physical movement parameters from a wearable computing device 110 worn and/or in possession of a VRU 104 and/or a portable device 112 in possession of the VRU 104. In one embodiment, the VRU bio-movement learning module 144 can access the one or more physical signal sensors 132 of the wearable computing device 110 to receive one or more physical movement parameters that are associated with the VRU 104. In another embodiment, if the VRU 104 is in possession of the portable device 112, the VRU bio-movement learning module 144 can additionally access the physical signal sensors 142 of the portable device 112 to retrieve the one or more physical movement parameters that are associated with the VRU 104. In one embodiment, the physical movement parameters retrieved from the wearable computing device 110 can be aggregated with the physical movement parameters retrieved from the portable device 112 to extract velocity data that is associated with the VRU 104. Specifically, as described above, the physical movement parameters can include, but are not limited to, the positional location of the VRU 104, the directional location of the VRU 104, the velocity of the VRU 104, and the acceleration of the VRU 104. For instance, if the VRU 104 is wearing the wearable computing device 110 and carrying the potable device 112, the VRU bio-movement learning module 144 can aggregate physical movement parameters retrieved from both devices 110, 112 to determine the velocity data of the VRU 104.

At block 308, the method includes determining if a requisite amount of biosignal parameter data and physical movement parameter data have been received to determine the VRU's exercise threshold values. One or more biosignal parameters and physical movement parameters can continue to be received by the VRU bio-movement learning module 144 and stored for a period of time until a requisite amount of data is collected in order for the VRU bio-movement learning module 144 to determine the VRU's exercise threshold values. If it is determined that the requisite amount of biosignal parameter data and physical movement parameter data has not been received to determine the VRU's exercise threshold values (at block 308), the process returns to block 304, wherein the bio-movement learning module 144 continues to receive one or more biosignal parameters from the wearable computing device 110 worn and/or in possession of the VRU 104.

If it is determined that a requisite amount of biosignal parameter data and physical movement parameter data has been received to determine the VRU's velocity threshold values (at block 308), at block 310, the method includes determining the VRU's exercise threshold values. In an exemplary embodiment, the VRU bio-movement learning module 144 can retrieve the biosignal parameters and physical movement parameters stored within the storage unit 126 of the wearable computing device 110 and/or the storage unit 138 of the portable device 112. The VRU bio-movement learning module 144 can then extract data pertaining to the velocity of the VRU 104 in order to be evaluated as velocity data of the VRU 104 over the course of the VRU contextual learning phase. Upon extracting the velocity data of the VRU 104 from the stored physical movement parameter data, the bio-movement learning module 144 can aggregate the biosignal parameter data and velocity data in order to determine the VRU's exercise threshold values. Specifically, the bio-movement learning module 144 can aggregate the biosignal parameter data and velocity data to determine the VRU's average biosignal parameter value(s) while the VRU 104 is moving at particular velocities. As an illustrative example, the VRU bio-movement learning module 144 can determine the VRU's average heart rate (e.g., 100 bpm) that is retrieved while the VRU 104 is in movement at a particular velocity (3.1 miles per hour). The bio-movement learning module 144 can then classify an average heart rate of the VRU 104 when the VRU 104 is moving at different rates and ranges of velocity (e.g., 0 mph to 2 mph, 2.1 mph to 4.0 mph, 4.1 mph to 7 mph, etc.) over the course of the VRU contextual learning phase to determine the resting exercise threshold value(s), the active exercise threshold value(s), and the hyperactive exercise threshold value(s) associated with the VRU 104.

In an illustrative example, the resting exercise threshold value(s) can include a heart rate value that is higher than the average heart rate value of the VRU 104 when the VRU 104 is stationary. The active exercise threshold value can include a heart rate value that is higher than the average heart rate value of the VRU 104 when the VRU 104 is moving at a slow or medium velocity (e.g., the VRU 104 is strolling, walking, or jogging). Additionally, the hyper-active exercise threshold value can include a heart rate value that is higher than the average heart rate value of the VRU 104 when the VRU 104 is moving at a high or very high velocity (e.g., the VRU 104 is running or biking). As will be described below, within the execution mode, the VVCM application 102 can determine one or more real time biosignal parameters associated with the VRU 104 to determine if the one or more real time biosignal parameter values fall below or above any of the VRU's exercise threshold values. It is appreciated that other embodiments are apparent to determine the VRU's exercise threshold values.

At block 312, the method includes determining if a requisite amount of physical movement parameter data has been received to determine the VRU'S velocity threshold values. The physical movement parameters can continue to be retrieved by the VRU bio-movement learning module 144 and stored for a period of time (within the storage unit 126 and/or storage unit 138) until a requisite amount of physical movement parameter data has been received in order for the VRU bio-movement learning module 144 to determine the VRU's velocity threshold values. If it is determined that a requisite amount of physical movement parameter data has not been received to determine the VRU's velocity threshold values (at block 312), the process returns to block 306, wherein the VRU bio-movement learning module 144 continues to receive one or more physical movement parameters from the wearable computing device 110 worn and/or in possession of the VRU 104 and/or the portable device 112 in possession of the VRU 104.

If it is determined that a requisite amount of physical movement parameter data has been received to determine the VRU's velocity threshold values (at block 312), at block 314, the method includes determining the VRU's velocity threshold values. In an exemplary embodiment, during the VRU contextual learning phase, the VRU bio-movement learning module 144 can extract data pertaining to the velocity of the VRU 104 from the physical movement parameter data stored within the storage unit 126 of the wearable computing device 110 and/or the storage unit 138 of the portable device 112 (received and stored during the course of the VRU contextual learning phase of the application 102). Upon extracting the velocity data of the VRU 104 from the stored physical movement parameter data, the bio-movement learning module 144 can determine average ranges of the VRU's velocity determined during the course of the VRU contextual learning phase to determine the VRU's velocity threshold values. Specifically, the bio-movement learning module 144 can evaluate the velocity data to determine a lower velocity range, a medium velocity range, and a higher velocity range (e.g., 0 mph to 2 mph, 2.1 mph to 4.1 mph, 4.1 mph to 7 mph, etc.). The bio-movement learning module 144 can classify an average velocity of the VRU 104 when the VRU 104 is moving at different rates and ranges of velocity over the course of the VRU contextual learning phase to determine the resting velocity threshold value, the walking velocity threshold value, and the running velocity threshold value.

As an illustrative example, the resting velocity threshold value can include a value that is higher than a zero velocity of the VRU 104 when the VRU 104 is stationary. The walking velocity threshold value can include a value that is higher than an average velocity of the VRU 104 when the VRU is moving at a slow or medium velocity (e.g., the VRU 104 is strolling, walking, or jogging). The running velocity threshold value can include value that is higher than an average velocity of the VRU 104 when the VRU is moving at a high or very high velocity (e.g., the VRU 104 is running or biking). As will be described below, within the execution mode, the VVCM application 102 can determine one or more real time biosignal parameters associated with the VRU 104 and one or more real time physical movement parameters associated with the VRU 104 to determine if the parameters are greater than or less than any of the VRU's velocity and exercise threshold values. It is appreciated that other embodiments are apparent to determine the velocity thresholds of the VRU 104.

At block 316, the method includes completing the contextual learning phase of the VVCM application 102. In an exemplary embodiment, upon determining the VRU's exercise threshold values and the VRU's velocity threshold values, the VRU bio-movement learning module 144 completes the contextual learning phase of the VVCM application 102.

In some embodiments, the VVCM application 102 can restart the VRU contextual learning phase after a predetermined period of time (e.g., 180 days) in order to dynamically evaluate one or more of the VRU's biosignal and physical movement parameters. For example, the VVCM application 102 can restart the VRU contextual learning phase in order to update the VRU's exercise threshold values and the VRU's velocity threshold values to account for changes with respect to one or more of the VRU's biosignal and velocity parameters over the course of time.

In additional embodiments, the VVCM application 102 can include a user settings user interface that can be accessed by the VRU 104 via the HMI output unit 128 (e.g., display) of the wearable computing device 110 and/or the HMI output unit 140 (e.g., display) of the portable device 112. The user settings user interface can include a VRU contextual learning phase initiation user input icon that can be inputted by the VRU 104 to reinitiate the VRU contextual learning phase wherein the method 300 restarts at block 302 before or after the completion of the VRU contextual learning phase (at block 316). As an illustrative example, the VRU 104 may wish to restart the VRU contextual learning phase to evaluate/reevaluate one or more of the VRU's biosignal and physical movement parameters during a period of time when the VRU 104 is injured with a broken leg. In this illustrative example, the restarting of the VRU contextual learning phase can ensure that the VVCM application 102 accounts for the VRU's 102 elevated heart rate and slower velocity in such a circumstance in order to properly estimate the probability of collision between the VRU 104 and the surrounding vehicle 106.

Referring again to FIG. 2, upon determining the biosignal parameters and the physical movement parameters associated with the VRU 104 (at block 202), as discussed in detail above, at block 204, the method includes determining a context of the VRU 104. The context of the VRU 104 can include a designation of the VRU's usage of the road that can be partially utilized to determine the propensity of collision between the VRU 104 and the vehicle 104 traveling on the road or a nearby road within a predetermined (surrounding) distance. The context of the VRU 104 can include but is not limited to a walking context, a running context, a biking context, and a passenger context. Specifically, VRU context determination module 146 of the VVCM 104 can determine the context of the VRU 104 within the execution phase of the VVCM application 104 by comparing the one or more biosignal parameters and velocity data associated with the VRU 104 determined in real time to the VRU's exercise threshold values and velocity threshold values determined during the VRU contextual learning phase of the VVCM application 102.

Figure 4:
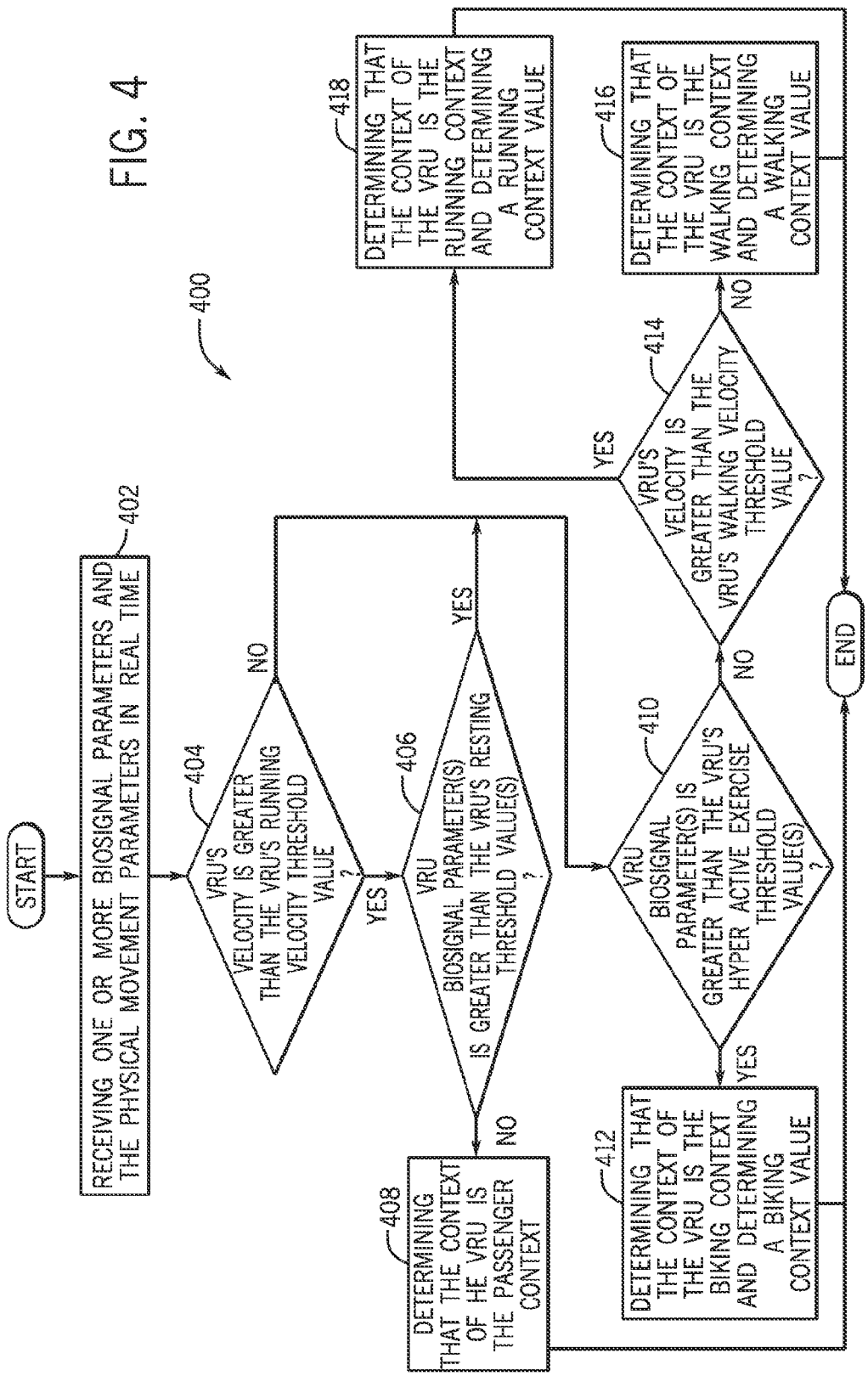
FIG. 4 is a process flow diagram of a method for determining a context of a vulnerable road user during an execution mode of the VRU vehicle collision application from the operating environment of FIG. 1 according to an exemplary embodiment.

FIG. 4 is a process flow diagram of a method 400 for determining the context of the VRU 104 during an execution mode of the VVCM application 102 from the operating environment of FIG. 1 according to an embodiment. FIG. 4 will be described with reference to the components of FIG. 1, though it is to be appreciated that the method of FIG. 4 can be used with other systems/components. Upon completion of the VRU contextual learning phase (at block 316 of FIG. 3), as discussed above, the VVCM application 102 initializes the execution phase. Within the execution phase, the VVCM application 102 can determine one or more real time biosignal parameters and physical movement parameters associated with the VRU 104 with respect to one or more physical movement parameters associated with the vehicle 106 in order to estimate a real time probability of collision between the VRU 104 and the vehicle 106.

At block 402, the method includes receiving one or more biosignal parameters and physical movement parameters in real time. In an exemplary embodiment, the VRU context determination module 146 can access the biosignal sensors 130 of the wearable computing device 110 to provide one or more of the VRU's biosignal parameters in real time within a predetermined time interval. For instance, the VRU context determination module 146 can access the biosignal sensors 130 to provide one or more of the VRU's biosignal parameters at a predetermined time interval of 50 ms at a frequency of about 20 Hz. Additionally, the VRU context determination module 146 can access the physical signal sensors 132 of the wearable computing device 110 and/or the physical signal sensors 142 of the portable device 112 to provide the one or more of the VRU's physical movement parameters in real time. The VRU context determination module 146 can then extract data pertaining to the velocity of the VRU 104 in order to be evaluated as real time velocity data of the VRU 104.

At block 404, the method includes determining if the VRU's velocity is greater than the VRU's running velocity threshold value. Specifically, the VRU context determination module 146 can communicate with the VRU bio-movement learning module 144 to receive the VRU's running velocity threshold value. Upon receiving the VRU's running velocity threshold value, the VRU context determination module 146 can evaluate the real time velocity (e.g., 2 mph) of the VRU 104 to determine if it is greater than the VRU's running velocity threshold value. If it is determined that the VRU's velocity is greater than the VRU's running velocity threshold value (at block 404), at block 406, it is determined if the VRU biosignal parameter(s) is greater than the VRU's resting threshold value(s). Specifically, the VRU context determination module 146 can communicate with the VRU bio-movement learning module 144 to receive the VRU's resting threshold value(s). Upon receiving the VRU's resting threshold value(s), the VRU context determination module 146 can evaluate one or more real time biosignal parameters associated with the VRU 104 to determine if they are greater than the VRU's resting threshold value(s) determined within the VRU context learning phase of the VVCM application 102. As an illustrative example, it is determined if the VRU's real time heart rate falls below or above the VRU's resting threshold heart rate value.

If it is determined that the VRU biosignal parameter(s) are less than the VRU's resting threshold value(s) (at block 406), at block 408, the method includes determining that the context of the VRU is the passenger context. Despite the determination that the VRU's velocity is greater than the VRU's running velocity threshold (at block 404), in some cases, the one or more real time biosignal parameters associated with the VRU 104 fall below the resting threshold value(s) (as determined at block 406). Therefore, the VRU context determination module 146 determines that the VRU 104 is not in a high state of physical activity that would justify the context of the VRU 104 as the biking context. In other words, since one or more of the VRU's biosignal parameters are determined to be below the resting threshold value(s), the VRU 104 is determined to be in a non-active state, and therefore, the VRU 104 is not determined to be biking even though his/her velocity is greater than the running velocity threshold value (at block 404). Therefore, the VRU context determination module 146 can determine that the context of the VRU 104 is the passenger context.

As an illustrative example, it is determined if the VRU's real time velocity is greater than the running velocity threshold value when one or more of the VRU's biosignal parameters are below the VRU's resting threshold. Since the VRU 104 is traveling at a high rate of speed, but has a low heart rate, the VRU 104 is not determined to be biking on the road. Instead, the VRU 104 may be a passenger within a bus who is exhibiting a resting heart rate as he or she is sitting, while the VRU 104 is exhibiting a higher velocity as the bus is traveling on the road.

If it is determined that the VRU's velocity is less than the VRU's running velocity threshold value (at block 404) or if it is determined that the VRU biosignal parameter(s) is greater than the VRU's resting threshold (at block 406), at block 410, the method includes determining if the VRU biosignal parameter(s) is greater than the VRU's hyper active exercise threshold value(s). Specifically, the VRU context determination module 146 can communicate with the VRU bio-movement learning module 144 to receive the VRU's hyper active exercise threshold value(s). Upon receiving the VRU's hyper active threshold value(s), the VRU context determination module 146 can evaluate one or more real time biosignal parameters associated with the VRU 104 to determine if they are greater than the VRU's hyperactive threshold value(s) determined within the VRU context learning phase of the VVCM application 102. As an illustrative example, it is determined if the VRU's real time heart rate falls below or above the VRU's hyper active exercise threshold heart rate value.

If it is determined that the VRU biosignal parameter(s) is greater than the VRU's hyper active exercise threshold value(s) (at block 410), at block 412, the method includes determining that the context of the VRU 104 is the biking context and determining a biking context value. In particular, since the VRU's velocity is greater than the VRU's running velocity threshold value (at block 404), the VRU's biosignal parameters are determined to be greater than the VRU's resting threshold value(s) and hyperactive exercise threshold value(s) (at blocks 406 and 410), the VRU context determination module 146 can determine that the context of the VRU 104 is the biking context. Specifically, the VRU context determination module 146 can determine that the VRU 104 is within the biking context, and is therefore biking on the road. In one embodiment, the VRU context determination module 146 can further evaluate the real time velocity data of the VRU 104 in order to assign a biking context value that can be utilized by the VVCM application 102 to more accurately estimate the probability of collision between the VRU 104 and the surrounding vehicle 106. For example, the biking context value can be a measure of the velocity of the VRU 104 within the biking context (e.g., 1 to 10 value that is associated with the VRU's biking speed and/or other factors).

If it is determined that the VRU biosignal parameter(s) is less than the VRU's hyper active exercise threshold value(s) (at block 410), at block 414, the method includes determining if the VRU's velocity is greater than the VRU's walking velocity threshold value. In particular, if it is determined that one or more of the VRU biosignal parameters are greater than the VRU's resting threshold value(s) (at block 406), but the one or more biosignal parameters are less than the VRU's hyper active threshold value(s) (at block 410), the VRU context determination module 146 takes into account that the VRU's biosignal parameters fall in between the VRU's resting threshold value(s) and the VRU's active threshold value(s). In other words, the VRU context determination module 146 can take into account that the VRU's biosignal parameters fall below the VRU's active threshold value(s). Therefore, the VRU context determination module 146 can evaluate the VRU's velocity to determine if the VRU 104 is in a walking context or a running context. Specifically, the VRU context determination module 146 can communicate with the VRU bio-movement learning module 144 to receive the VRU's walking velocity threshold value. Upon receiving the VRU's walking velocity threshold value, the VRU context determination module 146 can evaluate the real time velocity of the VRU 104 to determine if it is greater than the VRU's walking velocity threshold.

If it is determined that the VRU's velocity is less than the VRU's walking velocity threshold value (at block 414), at block 416, the method includes determining that the context of the VRU 104 is the walking context and determining a walking context value. In an exemplary embodiment, the VRU context determination module 146 can determine that the VRU 104 is within the walking context, and is therefore walking on the road. In one embodiment, the VRU context determination module 146 can further evaluate the real time velocity data of the VRU 104 in order to assign the walking context value that can be utilized by the VVCM application 102 to more accurately estimate the probability of collision between the VRU 104 and the surrounding vehicle 106. For example, the walking context value can be a measure of the velocity of the VRU 104 within the walking context (e.g., 1 to 10 value that is associated with the VRU's walking speed and/or other factors).

If it is determined that the VRU's velocity is greater than the VRU's walking velocity threshold value (at block 414), at block 418, the method includes determining that the context of the VRU 104 is the running context and determining a running context value. In an exemplary embodiment, the VRU context determination module 146 can determine that the VRU 104 is within the running context, and is therefore is running on the road.

In one embodiment, the VRU context determination module 146 can further evaluate the real time velocity data of the VRU 104 in order to assign a running context value that can be utilized by the VVCM application 102 to accurately estimate the probability of collision between the VRU 104 and the surrounding vehicle 106. For example, the running context value can be a measure of the velocity of the VRU 104 within the running context (e.g., 1 to 10 value that is associated with the VRU's walking speed and/or other factors).

In an alternate embodiment, the VRU context determination module 146 can receive data from the physical signal sensors 132 of the wearable computing device 110 and/or the physical signal sensors 142 of the portable device 112 to determine if the VRU's acceleration is rhythmic. If the wearable computing device 110 and/or the portable device 112 is moving without rhythmic acceleration, it is more likely that the VRU 104 is within the biking context. Therefore, if the VRU's acceleration is rhythmic, the VRU context determination module 146 can determine if the VRU context is not the biking context Specifically, the VRU context determination module 146 can utilize the physical signal sensors 132, 142 to further determine the VRU's velocity in order to determine if the VRU 104 is within the walking context or the running context or within the passenger context. It is to be appreciated that VRU context determination module 146 can also determine the VRU's context by utilizing various alternate types of data that is provided by the physical signal sensors 132, 142 and/or the biosignal sensors 130.

In some embodiments, the VRU context determination module 146 can communicate with the control unit 122 of the wearable computing device 110 and/or the control unit 134 of the portable device 112 to determine one or more applications that are being executed. The one or more executed applications can be evaluated to determine if the applications pertain to the context of the VRU 104. For example, the VRU 104 may use a running tracker application while running to track the VRU's running distance. The VRU context determination module 146 can use this information to determine the context of the VRU 104 in addition to the VRU's exercise threshold values and velocity threshold values.

Referring again to FIG. 2, upon determining a context of the VRU 104 (at block 204), as discussed in detail above, at block 206, the method includes determining physical movement data of a vehicle 106. In an exemplary embodiment, the vehicle physical movement determination module 148 can access the vehicle sensors 118 to determine the real time physical movement data of the vehicle 106. The vehicle physical movement determination module 148 can evaluate data provided by the vehicle sensors 118 (e.g., speed, yaw rate, acceleration, steering wheel angle, GNSS coordinates, etc.) in order to determine the velocity of the vehicle 106, the directional orientation of the vehicle 106, and the positional location of the vehicle 106. In some embodiments, the vehicle physical movement determination module 148 can determine the specific mapped location of the vehicle 106. Further, the vehicle physical movement determination module 148 can track the vehicle's path of travel on the road that can be saved within the storage unit 116 of the vehicle 106 for a predetermined amount of time. As described in more detail below, the vehicle's path of travel can be utilized to more accurately estimate the probability of collision between the vehicle 106 and the VRU 104.

At block 208, the method includes estimating a probability of collision between the VRU 104 and the vehicle 106. In an exemplary embodiment, upon the vehicle physical movement determination module 148 determining the physical movement data of the vehicle 106 (at block 206), the collision probability estimation module 150 can aggregate the context of the VRU 104, one or more physical movement parameters associated with the vehicle 106, and/or one or more physical movement parameters associated with the VRU 104 in order to estimate the probability of collision between the vehicle 106 and the VRU 104. It is to be appreciated that the VVCM application 102 can estimate the collision probability at one or all of the head unit 108 of the vehicle 106, the wearable computing device 110, the portable device 112, and/or the externally hosted computing infrastructure. It is also to be appreciated that one or all of the vehicle 106, the wearable computing device 110, and/or the portable device 112 can communicate between each other and the externally hosted computing infrastructure to utilize the data to be compiled.

Figure 5A:
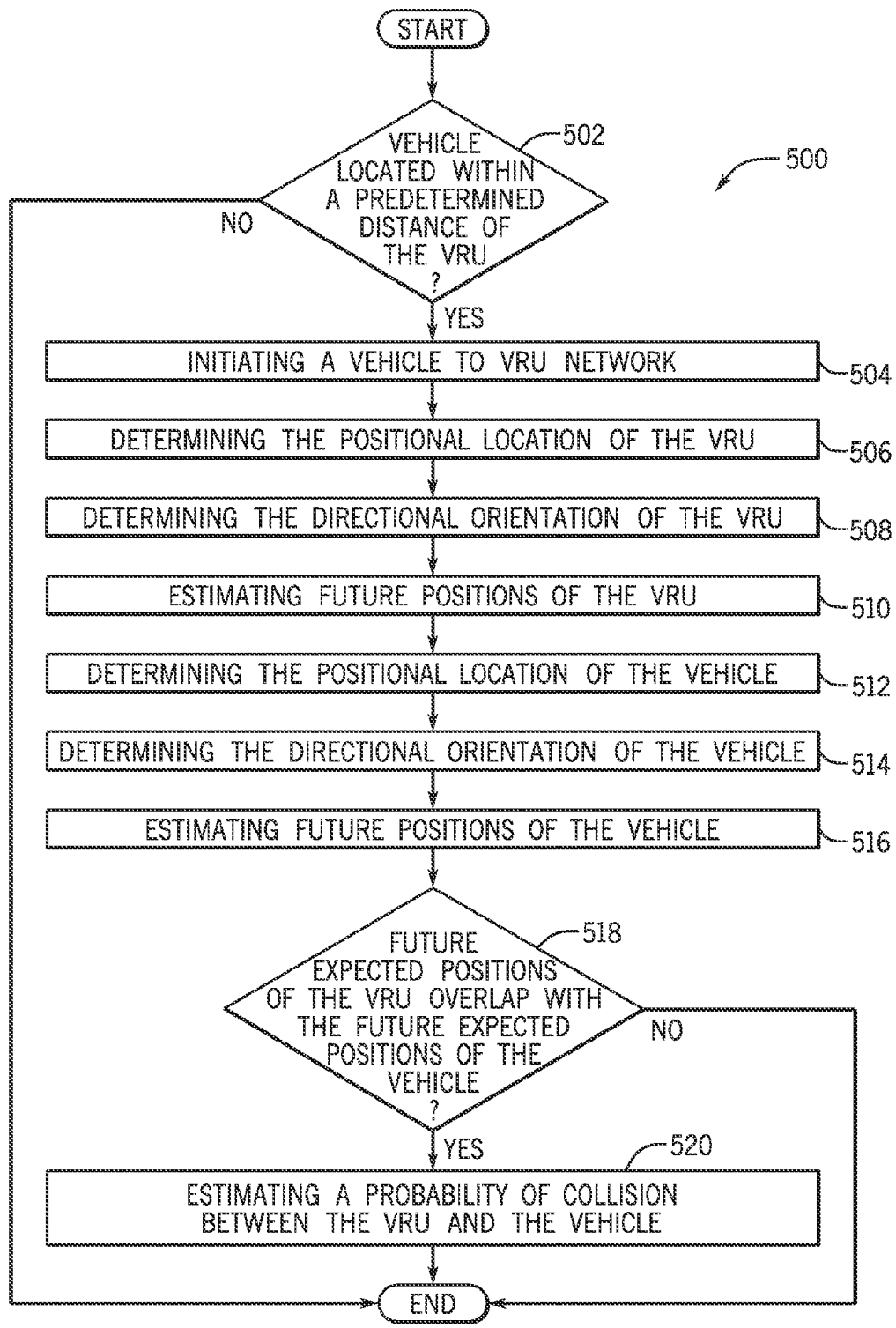
FIG. 5A is a process flow diagram of a method for determining an overlap between the future expected positions of the vulnerable road user and the vehicle during the execution phase of the VRU vehicle collision application from the operating environment of FIG. 1 according to an exemplary embodiment.

FIG. 5A is a process flow diagram of a method 500 for determining an overlap between future expected positions of the VRU 104 and the vehicle 106 during an execution phase of the VVCM application 102 from the operating environment of FIG. 1 according to an embodiment. FIG. 5A will be described with reference to the components of FIG. 1, though it is to be appreciated that the method of FIG. 5A can be used with other systems/components. At block 502, the method includes determining if a vehicle 106 is located within a predetermined distance of the VRU 104. In one embodiment, the collision probability estimation module 150 of the VVCM application 102 can utilize the communication device 124 of the wearable computing device 110 and/or the communication device 136 of the portable device 112 to transmit a polling signal within a predetermined distance from the VRU 104 to identify and communicate with one or more vehicles 106 that are located within the surrounding environment of the VRU 104.

Upon the receipt of the polling signal by the communication device 120 of the vehicle 106, the collision probability estimation module 150 can utilize the communication device 120 to transmit a confirmation signal to the wearable computing device 110 and/or the portable device 112. Upon receipt of the confirmation signal by the communication device 124 of the wearable computing device 110 and/or the communication device 136 of the portable device 112, the collision probability estimation module 150 can determine that the vehicle 106 is located within the predetermined distance of the VRU 104. It is to be appreciated that in another embodiment, the polling signal can be transmitted by the communication device 120 of the vehicle 106 to the wearable computing device 110 and/or the portable device 112. Accordingly, upon receipt of the polling signal by the communication device 124 of the wearable computing device 110 and/or the communication device 136 of the portable device 112, the confirmation signal can be transmitted to the vehicle 106.

In another embodiment, the collision probability estimation module 150 can access the physical signal sensors 132 of the wearable computing device 110 and/or the physical signal sensors 142 of the portable device 112 to receive one or more real time physical movement parameters associated with the VRU 104. Additionally, the collision probability estimation module 150 can access the vehicle sensors 118 to receive one or more real time physical parameters associated with the vehicle 106. Upon receiving the one or more real time physical movement parameters, the collision probability estimation module 150 can evaluate the parameters to determine the real time positional location of the VRU 104 and the real time positional location of the vehicle 106 to determine if the vehicle 106 and the VRU 104 are located within a predetermined distance of the VRU 104.

Upon determining that the vehicle is located within a predetermined distance of the VRU 104 (at block 502), at block 504, the method includes initiating a vehicle to VRU network. In one embodiment, the collision probability estimation module 150 can initiate the vehicle to VRU network by using a medium such as DSRC that can be used to provide data transfer to send/receive electronic signals with the wearable computing device 110, the portable device 112 and the vehicle 106.

At block 506, the method includes determining the positional location of the VRU 104. Specifically, the collision probability estimation module 150 can access the physical signal sensors 132 of the wearable computing device 110 and/or the physical signal sensors 142 of the portable device 112 to provide the VRU's real time physical movement parameters. In one embodiment, the collision probability estimation module 150 can also store the VRU's physical movement parameters within the storage unit 126 of the wearable computing device 110 and/or the storage unit 138 of the portable device 112 for a predetermined period of time to establish a trend in the VRU's physical movement parameters. As will be described below, the trend in the VRU's physical movement parameters can be evaluated to estimate the future position of the VRU 104. The collision probability estimation module 150 can further evaluate the physical movement parameters associated with the VRU 104 to determine the positional location of the VRU 104.

At block 508, the method includes evaluating the directional orientation of the VRU 104. Specifically, the collision probability estimation module 150 can evaluate the physical movement parameters associated with the VRU 104 to extract the directional orientation of the VRU 104 on the road.

At block 510, the method includes estimating future positions of the VRU 104. In an exemplary embodiment, the collision probability estimation module 150 can evaluate the physical location of the VRU 104 to determine the exact location of the VRU 104 on the road (e.g., GNSS coordinates). Additionally, the collision probability estimation module 150 can evaluate the directional orientation of the VRU 104 to determine the heading of the VRU 104 as the VRU 104 is traveling at a specific location on the road. The collision probability estimation module 150 can further evaluate the trend of the directional orientation and positional location of the VRU 104 to determine a path of travel that can be utilized to estimate the future positions of the VRU 104 on the road. In some embodiments, the collision probability estimation module 150 can further access navigational map data (e.g., from a navigation application executed on the head unit 108, wearable computing device 110, and/or portable device 112) to determine characteristics (e.g., width, length, number of lanes, curbs, intersections, objects, speed limits, etc.) of the road that the VRU 104 is traveling on. This information can also be evaluated to estimate the future position of the VRU 104.

FIG. 5B is an illustrative example of estimating an overlap between the expected path of a VRU 104 and the expected path of a vehicle 106 based on the process flow diagram of FIG. 5A according to an exemplary embodiment. The collision probability estimation module 150 can evaluate the positional location of the VRU 104 (shown as t0) and the directional orientation of the VRU 104 (as represented by the arrow from t0). The collision probability estimation module 150 can also evaluate the map data to determine that the intersection 550 is located ahead of the VRU 104 and that the directional orientation of the VRU 104 is facing towards the intersection 550. The map data can also be evaluated to determine that there are no objects, curves, or other outlets that could be possible traveled by the VRU 104 to change his/her directional orientation. The collision probability estimation module 150 can aggregate the gathered data and can further evaluate the past trend of the directional orientation and positional location of the VRU 104 (shown as p-3, p-2, p-1) at time t-3, t-2, t-1 to estimate the future estimated positions of the VRU 104 (shown as p1, p2, p3) at time t1, t2, t3. As will be discussed below, the future estimated positions of the VRU 104 will be compared to the future estimated positions of the vehicle 106 in order to determine an overlap between the VRU 104 and the vehicle 106.

Referring again to FIG. 5A, at block 512, the method includes determining the positional location of the vehicle 106. Specifically, the collision probability estimation module 150 can utilize the vehicle sensors 118 to provide one or more real time physical movement parameters associated with the vehicle 106. In one embodiment, the collision probability estimation module 150 can also store the one or more physical movement parameters associated with the vehicle 106 within the storage unit 126 of the wearable computing device 110 and/or the storage unit 138 of the portable device 112 for a predetermined period of time to establish a trend of the positional location and directional orientation of the vehicle 106. As will be described below, the trend in the positional location and directional orientation of the vehicle 106 can be evaluated to estimate the future position of the vehicle 106. The collision probability estimation module 150 can further evaluate the physical movement parameters associated with the vehicle 106 to determine the positional location of the vehicle 106.

At block 514, the method includes determining the directional orientation of the vehicle 106. Specifically, the collision probability estimation module 150 can evaluate the physical movement parameters associated with the vehicle 106 to extract the directional orientation of the vehicle 106 on the road. At block 516, the method includes estimating future positions of the vehicle 106. In an exemplary embodiment, the collision probability estimation module 150 can evaluate the physical location of the vehicle 106 to determine the exact location of the vehicle 106 on the road (e.g., GNSS coordinates). Additionally, the collision probability estimation module 150 can evaluate the directional orientation of the vehicle 106 to determine the heading of the vehicle 106 as the VRU 104 is traveling at a specific location on the road. The collision probability estimation module 150 can further evaluate the trend of the directional orientation and positional location of the VRU 104 to determine a path of travel that can be utilized to estimate the future position of the vehicle 106. As discussed, in some embodiments, the collision probability estimation module 150 can further access the navigational map data to determine characteristics of the road that the vehicle 106 is traveling on to be evaluated to estimate the future position of the vehicle 106.

Referring again to the illustrative example of FIG. 5B, the collision probability estimation module 150 can evaluate the positional location of the vehicle 106 (shown as x0) and the directional orientation of the vehicle 106 (as represented by the arrow from x0). The collision probability estimation module 150 can evaluate the map data to determine that the intersection 550 is located ahead of the vehicle 106 and that the directional orientation of the vehicle 106 is facing towards the intersection 550. The map data can also be evaluated to determine that there are no objects, curves, or other outlets that could possibly cause the driver of the vehicle 106 to change the vehicle's directional orientation. The collision probability estimation module 150 can aggregate the gathered data and can further evaluate the trend of the directional orientation and positional location of the vehicle 106 (shown as x-1, x-2, x-3) to estimate the future estimated positions of the vehicle 106 (shown as x1, x2, x3).

Referring again to FIG. 5A, at block 518, the method includes determining if the future expected positions of the VRU 104 overlap with the future expected positions of the vehicle 106. In an exemplary embodiment, the collision probability estimation module 150 can evaluate the estimated future positions of the VRU 104 (determined at block 510) and the estimated future positions of the vehicle 106 (determined at block 516) to determine one or more estimated points of overlap. As described below, the collision probability estimation module 150 can register the one or more estimated points of overlap as position locational coordinates that can be used to estimate the probability of collision between the VRU 104 and the vehicle 106. As shown in FIG. 5B, the future estimated positions of the VRU 104 will be compared to the future estimated positions of the vehicle 106 in order to estimate an overlap of the estimated position of the vehicle 106 at x3 and the estimated position of the VRU at t3.

Referring again to FIG. 5A, if it is determined that the future expected positions of the VRU 104 overlap with the future expected positions of the vehicle 106 (at block 518), at block 520, the method includes estimating a probability of collision between the VRU 104 and the vehicle 106. As will be described in more detail, with respect to FIG. 6 below, the collision probability estimation module 150 can evaluate the context of the VRU 104, the velocity of the VRU 104, the velocity of the vehicle 106, and one or more collision probability factors to estimate the probability of collision between the VRU 104 and the vehicle 106.

Figure 6:
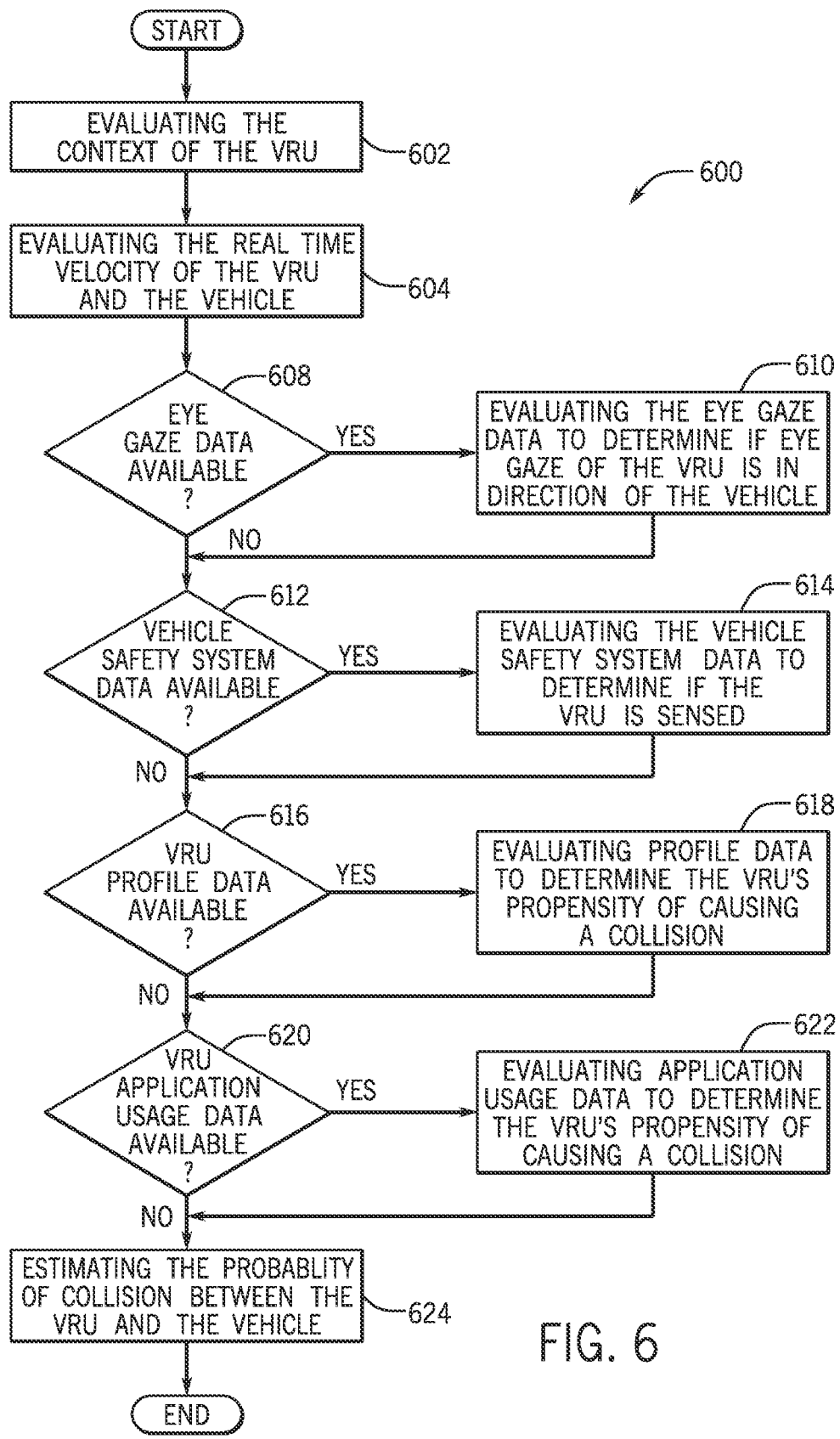
FIG. 6 is a process flow diagram of a method for estimating a probability of collision between the vulnerable road user and the vehicle during the execution phase of the VRU vehicle collision application from the operating environment of FIG. 1 according to an exemplary embodiment.

FIG. 6 is a process flow diagram of a method 600 for estimating a probability of collision between a VRU 104 and a vehicle 106 during an execution phase of the VVCM application 102 from the operating environment of FIG. 1 according to an embodiment. FIG. 6 will be described with reference to the components of FIG. 1, though it is to be appreciated that the method of FIG. 6 can be used with other systems/components. In an exemplary embodiment, once it is determined that the future expected positions of the VRU 104 overlap with the future estimated positions of the vehicle 106 (at block 516 of FIG. 5A), the collision probability estimation module 150 can evaluate additional collision probability factors to estimate the probability that the overlap of estimated future positions will result in a collision between the VRU 104 and the vehicle 106. In one embodiment, the probability of collision can include one or more values that are indicative of propensity and intensity of collision between the VRU 104 and the vehicle 106.

At block 602, the method includes evaluating the context of the VRU 104. In one embodiment, the collision probability estimation module 150 can communicate with the VRU context determination module 146 to receive the context of the VRU 104 that is located within a predetermined distance of the vehicle 106. The collision probability estimation module 150 can evaluate the context of the VRU 104 to partially determine the probability of collision between the VRU 104 and the vehicle 106. In one embodiment, the collision probability estimation module 150 can estimate a higher probability of collision when the VRU 104 is within the biking context and a relatively lower probability of collision when the VRU 104 is within the running context. Additionally, the collision probability estimation module 150 can estimate a higher probability of collision when the VRU 104 is within the running context and a relatively lower probability of collision when the VRU 104 is within the walking context. As an illustrative example, when the VRU 104 is within the biking context the collision probability estimation module 150 may determine that the VRU's reaction and time to slow down, stop, and/or avoid an imminent collision with the vehicle 106 may be reduced. Therefore, the estimated collision probability can be increased. Also, the collision probability estimation module 150 can lower the probability of collision between the VRU 104 and the vehicle 106 when the VRU 104 is within the passenger context.

The collision probability estimation module 150 can also evaluate the associated context value of the VRU 104 in order to estimate a starting, stopping, and moving rhythm of the VRU 104 to more accurately estimate the probability of collision between the VRU 104 and the vehicle 106. As an illustrative example, when the VRU 104 is within the running context and is determined to have a running context value of 8 out of 10, the collision probability estimation module 150 can determine that the VRU 104 is more likely to move aggressively or randomly than if the context value is 4 out of 10. In some embodiments, the collision probability estimation module 150 can communicate with the VRU context determination module 146 to receive one or more of the VRU's real time biosignal parameters. Additionally, the collision probability estimation module 150 can communicate with the VRU bio-movement learning module 144 to determine the VRU's exercise threshold values.

The collision probability estimation module 150 can evaluate the one or more real time biosignal parameters to determine one or more parameters that are determined to be highly exceeding the VRU's hyper active exercise threshold value in order to increase the probability of collision between the VRU 104 and the vehicle 106. For instance, if the heart rate or respiratory rate of the VRU 104 is determined to be very high compared to the VRU's hyper active exercise threshold value, the collision probability estimation module 150 can increase the probability of collision between the VRU 104 and the vehicle 106, as the VRU 104 maybe in a state of elevated stress. It will be apparent that other collision probability factors (e.g., eye gaze of the VRU 104, vehicle safety system data, etc.), can be evaluated by the collision probability estimation module 150 to estimate the probability of collision between the VRU 104 and the vehicle 106.

At block 604, the method includes evaluating the real time velocity of the VRU 104 and the vehicle 106. Specifically, the collision probability estimation module 150 can access the physical signal sensors 132 of the wearable computing device 110 and/or the physical signal sensors 142 of the portable device 112 to receive the real time physical movement parameters associated with the VRU 104. The collision probability estimation module 150 can extract the VRU's real time velocity from the real time physical movement parameters in order to evaluate the real time velocity of the VRU 104. Similarly, the collision probability estimation module 150 can access the vehicle sensors 118 to receive the real time physical movement parameters associated with the vehicle 106. In an exemplary embodiment, the collision probability estimation module 150 can evaluate the real time velocity of the VRU 104 along with the estimated future positions of the VRU 104 (as determined at block 508 of FIG. 5A) with respect to the real time velocity of the vehicle 106 along with the estimated future positions of the vehicle 106 (as determined at block 514 of FIG. 5A) to determine the predicted timeframe at which the VRU 104 and the vehicle 106 can collide. The predicted timeframe can be utilized by the collision probability estimation module 150 to estimate the probability of collision between the VRU 104 and the vehicle 106.

At block 608, it is determined if eye gaze data is available. In one more embodiments, the physical signal sensors 132 of the wearable computing device 110 can include one or more cameras and/or eye gaze sensors that can determine the eye gaze of the VRU 104. For example, the wearable computing device 110 can include a head mounted display unit or glasses that can include one or more cameras and/or eye gaze sensors that can be utilized by various applications that are executed or accessed by the wearable computing device 110. The collision probability estimation module 150 can access the physical signal sensors 132 to determine if eye gaze data is available.

If it is determined that the eye gaze data is available (at block 608), at block 610, the method includes evaluating the eye gaze data to determine if the eye gaze of the VRU 104 is in the direction of the vehicle 106. Specifically, the collision probability estimation module 150 can access the physical signal sensors 132 of the wearable computing device 110 to receive the real time eye gaze data of the VRU 104. Upon receiving the eye gaze data of the VRU 104, the collision probability estimation module 150 can evaluate the eye gaze data to determine if the VRU's eye gaze is in the direction of the vehicle 106 (i.e., the VRU 104 is looking at and/or has seen the vehicle 106). Specifically, the collision probability estimation module 150 can analyze the gaze data along with the physical location and directional orientation of the VRU 104 and the vehicle 106 in order to determine if the gaze of the VRU 104 is in the direction of the physical location of the vehicle 106. The gaze data can be utilized by the collision probability estimation module 150 as another collision probability factor to estimate the probability of collision between the VRU 104 and the vehicle 106. For example, if the collision probability estimation module 150 determines that the VRU 104 is looking at the vehicle 106, the collision probability estimation module 150 can lower the probability of collision between the VRU 104 and the vehicle 106, as the VRU 104 may account for the vehicle 104 and change his/her course of travel.

At block 612, it is determined if vehicle safety system data is available. In one more embodiments, the vehicle sensors 118 can include, but are not limited to, cameras mounted to the interior or exterior of the vehicle 106, radar and laser sensors mounted to the exterior of the vehicle 106, and/or radar and laser sensors. These sensors can be used by one or more vehicles safety systems (e.g., blind spot sensing system, park assist system, collision avoidance system, etc.) that can be used to warn the driver of the vehicle 106 of one or more potential safety hazards. The collision probability estimation module 150 can access the vehicle sensors 118 to determine if vehicle safety system data is available.

If it is determined that the vehicle safety system data is available (at block 612), at block 614, the method includes evaluating the vehicle safety system data to determine if the VRU 104 is sensed. Specifically, the collision probability estimation module 150 can access the vehicle sensors 118 to receive real time safety system data. Upon receiving the safety system data, the collision probability estimation module 150 can evaluate the safety system data to determine if the VRU 104 is detected by the safety system data (i.e., the driver of the vehicle 106 is provided a warning or notification of the presence and/or location of the VRU 104). In one embodiment, the collision probability estimation module 150 can communicate with the head unit 108 of the vehicle 106 to determine if one or more vehicle safety systems provide an indication or warning to the driver of the vehicle 106 of the presence and/or location of the VRU 104. The vehicle safety system data can be utilized by the collision probability estimation module 150 as another collision probability factor to estimate the probability of collision between the VRU 104 and the vehicle 106. For example, if the collision probability estimation module 150 determines that the driver of the vehicle 106 has been notified of the presence of the VRU 104 on the road, the collision probability estimation module 150 can lower the probability of collision between the VRU 104 and the vehicle 106, as the driver of the vehicle 106 may account for the VRU 104 and change the vehicle's course of travel.

At block 616, it is determined if VRU profile data is available. As discussed above, the storage unit 138 of the portable device 112 can include profile data that pertains to the VRU 104 that is utilized by one or more applications that are executed on the portable device 112. Such profile data could have been inputted during an initial setup of the portable device 112 and can include, but is not limited to, the user's age, gender, and/or other demographic information. The collision probability estimation module 150 can access the storage unit 138 to determine if profile data is available.

If it is determined that VRU profile data is available (at block 616), at block 618, the method includes evaluating profile data to determine the VRU's propensity of causing a collision. In one embodiment, the collision probability estimation module 150 can access the profile data from the storage unit 138 to access demographic information pertaining to the VRU 104 that includes. For instance, the collision probability estimation module 150 can characterize various VRU age groups as having a higher propensity to be involved in a collision. The profile data can be utilized by the collision probability estimation module 150 as another collision probability factor to estimate the probability of collision between the VRU 104 and the vehicle 106. For example, if the VRU's age group is characterized as a child (specifically, a boy), the collision probability estimation module 150 may increase the probability of collision between the VRU 104 and the vehicle 106, as a child may not exhibit much caution and may perform more irrational movements that equate to a higher propensity of being involved in a collision.

At block 620, the method includes determining if VRU application usage data is available. The collision probability estimation module 150 can communicate with the control unit 122 of the wearable computing device 110 and/or the control unit 134 of the portable device 112 to access the application usage data in order to determine one or more specific applications that are being used by the VRU 104 via the wearable computing device 110 and/or the portable device 112. The collision probability estimation module 150 can access the control unit 122 and/or the control unit 134 to determine if the VRU application usage data is available.

If it is determined that the VRU application usage data is available (at block 620), at block 622, the method includes evaluating the application usage data to determine the VRU's propensity of causing a collision. Specifically the collision probability estimation module 150 evaluates the application usage data in order to determine if the VRU 104 is utilizing certain types of applications (e.g., texting, social media, gaming, etc.) that require the VRU 104 to divert his or her attention from the road. The VRU application usage data can be utilized by the collision probability estimation module 150 as another collision probability factor to estimate the probability of collision between the VRU 104 and the vehicle 106. For example, if the VRU 104 is determined to be using a social media application, the collision probability estimation module 150 may increase the probability of collision between the VRU 104 and the vehicle 106, as the VRU 104 may be distracted.

At block 624, the method includes estimating the probability of collision between the VRU 104 and the vehicle 106. In an exemplary embodiment, the collision probability estimation module 150 can establish a collision probability range to specify the potential time frame and intensity of the probable collision between the VRU 104 and the vehicle 106. In one embodiment, the collision probability range can be divided into ten subunits, wherein a lower probability of collision can be represented as a value of 1 and an extremely high probability of collision can be represented as a value of 10. It is to be appreciated that collision probability estimation module 150 can estimate the probability of collision to be represented in various types formats such as of different ranges, metrics, and values. As the VRU 104 and the vehicle 106 are traveling and approach each other the method 600 can continuously be executed to re-estimate the probability of collision between the VRU 104 and the vehicle 106 in order to adjust the probability of collision.

Referring again to FIG. 2, upon estimating a probability of collision between the VRU 104 and the vehicle 106 (at block 208), as discussed in detail above, at block 210, the method includes controlling a HMI output response. In an exemplary embodiment, the HMI output control module 152 of the VVCM application 102 can communicate with the collision probability estimation module 150 to receive the estimated probability of collision. Upon receiving the estimated probability of collision, the HMI output control module 152 can access the head unit 108 of the vehicle 106 to provide one or more collision prevention warnings to the driver of the vehicle 106. Additionally, the HMI output control module 152 can access the HMI output unit 128 of the wearable computing device 110 and/or the HMI output unit 140 of the portable device 112 to provide one or more collision prevention warnings to the VRU 104. The one or more collision prevention warnings can be presented to the driver of the vehicle 106 and/or the VRU 104 as an audio warning, a visual warning, and/or a haptic warning. For example, upon receiving the estimated probability of collision, the HMI output control module 152 can provide visual warning via the display of the head unit 108 and/or the portable device 112 and an audio warning via the audio system of the vehicle 106 and/or speakers of the portable device 112.

In one or more embodiments, the one or more collision prevention warnings provided to the driver of the vehicle 106 and/or the VRU 104 can vary in intensity based on the estimated probability of collision between the VRU 104 and the vehicle 106, as estimated by the collision probability estimation module 150. For instance, the HMI output control module 152 may evaluate the collision probability range to determine if the probability of collision is a lower, medium, or high probability of collision. The HMI output control module 152 can then provide the one or more collision prevention warnings at a level that corresponds to the estimated collision probability range value. For example, the low intensity warning (indicative of a low probability of collision) can include a simple audio buzzing warning that is presented via the audio system of the vehicle 106 and/or speakers of the portable device 112. Additionally, the high intensity warning (indicative of a high probability of collision) can include tactile feedback via the steering wheel of the vehicle 106 and the portable device 112 along with audio and visual warnings that are provided to the driver of the vehicle 106 and/or the VRU 104.

In some embodiments, upon receiving the estimated probability of collision, the HMI output control module 152 can access the VCD 114 in order to control one or more vehicle systems and/or functions (e.g., engine control unit, acceleration, braking, etc.) to provide the collision avoidance capability. For example, the VCD 114 can control the engine control unit and/or the braking system to decelerate the speed of the vehicle 106 or stop the vehicle 106 based on a estimated probability of collision between the vehicle 106 and the VRU 104. The collision avoidance capability can be based on the estimated probability of collision between the VRU 104 and the vehicle 106, as estimated by the collision probability estimation module 150. For instance, the VCD 114 may evaluate the collision probability range to determine if the probability of collision is a lower, medium, or high probability of collision. The VCD 114 can then control one or more vehicle systems/functions in a manner that corresponds to the estimated collision probability range value.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules or other data. Non-transitory computer readable storage media excludes transitory and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for vehicle collision mitigation with vulnerable road user context sensing, comprising:

determining one or more biosignal parameters and one or more physical movement parameters associated with a vulnerable road user (VRU), wherein the one or more biosignal parameters associated with the VRU include data pertaining to at least one of: a heart rate, a respiration rate, and a blood pressure associated with the VRU, wherein the one or more physical movement parameters associated with the VRU include data pertaining to a location and movement of the VRU, wherein determining the one or more biosignal parameters and the one or more physical movement parameters associated with the VRU includes determining exercise threshold values of the VRU, wherein it is determined if a requisite amount of biosignal parameter data and physical movement parameter data have been received to determine the exercise threshold values of the VRU, wherein upon determining that the requisite amount of biosignal parameter data and physical movement parameter data have been received, the biosignal parameter data and extracted velocity data of the VRU are aggregated to determine average biosignal parameter values while the VRU is moving at particular velocities;

determining a context of the VRU based on the one or more biosignal parameters and one or more physical movement parameters associated with the VRU;

determining one or more physical movement parameters associated with a vehicle, wherein the one or more physical movement parameters associated with the vehicle include data pertaining to a location and movement of the vehicle;

estimating a probability of collision between the VRU and the vehicle based on the context of the VRU, the one or more physical movement parameters associated with the VRU, and the one or more physical movement parameters associated with the vehicle; and providing a human machine interface output response based on the estimation of the probability of collision between the VRU and the vehicle, wherein the human machine interface output response is provided on at least one of the following: a head unit of the vehicle, a wearable computing device, and a portable device includes controlling a braking system of the vehicle to decelerate a speed of the vehicle in a manner that corresponds to the estimation of the probability of collision between the VRU and the vehicle.

2. The computer-implemented method of claim 1, wherein determining the one or more biosignal parameters and one or more physical movement parameters associated with the VRU includes at least one of: a wearable computing device sensing one or more biosignal parameters associated with the VRU, the wearable computing device sensing one or more physical movement parameters associated with the VRU, and a portable device sensing one or more physical movement parameters associated with the VRU, wherein the one or more biosignal parameters and the one or more physical movement parameters are sensed and stored for a predetermined amount of time on at least one of: a storage unit of the wearable computing device and a storage unit of the portable device.

3. The computer-implemented method of claim 2, wherein the exercise threshold values includes at least one of: a resting exercise threshold value, an active exercise threshold value, or a hyperactive exercise threshold value, wherein the exercise threshold values of the VRU are based on analyzing the one or more biosignal parameters associated with the VRU that are sensed and stored for the predetermined amount of time.

4. The computer-implemented method of claim 2, wherein determining the one or more biosignal parameters and the one or more physical movement parameters associated with the VRU includes determining velocity threshold values of the VRU, wherein the velocity threshold values includes at least one of: a resting velocity threshold value, a walking velocity threshold value, or a running velocity threshold value, wherein the velocity threshold values of the VRU are based on analyzing the physical movement parameters associated with the VRU that are sensed and stored for the predetermined amount of time.

5. The computer-implemented method of claim 4, wherein determining the context of the VRU includes receiving the one or more biosignal parameters and the one or more physical movement parameters associated with the VRU in real time and determining if the one or more biosignal parameters are greater than one or more exercise threshold values and determining if the one or more physical movement parameters are greater than the velocity threshold values of the VRU, wherein the context of the VRU includes at least one of: a walking context, a running context, a biking context, or a passenger context.

6. The computer-implemented method of claim 5, wherein estimating the probability of collision between the VRU and the vehicle includes determining an overlap between future expected positions of the VRU and future expected positions of the vehicle, wherein the future expected positions of the VRU are determined by analyzing one or more physical movement parameters associated with the VRU in real time, wherein the future expected positions of the vehicle is determined by analyzing one or more physical movement parameters associated with the vehicle in real time.

7. The computer-implemented method of claim 6, wherein estimating the probability of collision between the VRU and the vehicle includes evaluating the context of the VRU, a velocity of the VRU in real time, and a velocity of the vehicle in a real time with respect to the determined overlap between the future expected positions of the VRU and the future expected positions of the vehicle.

8. The computer-implemented method of claim 6, wherein estimating the probability of collision between the VRU and the vehicle includes evaluating one or more collision probability factors to determine at least one of: a probability that the overlap of estimated future expected positions will result in a collision and a predicted timeframe at which the VRU and the vehicle may collide.

9. The computer-implemented method of claim 1, wherein providing the human machine interface output response includes controlling the human machine interface output response to provide an output response that correspond to the adjusted estimated probability of collision between the VRU and the vehicle, wherein the human machine interface output response includes a warning provided through a display device, an audio device, or a haptic device within the vehicle.

10. A system for providing vehicle collision mitigation with vulnerable road user context sensing, comprising:
  a vulnerable road user (VRU) vehicle collision mitigation application that is executed on at least one of: a wearable computing device worn by and/or in possession of the vulnerable road user, a portable device in possession of the VRU, and a head unit of a vehicle, wherein the wearable computing device includes biosignal sensors and physical signal sensors, the portable device includes physical signal sensors, and the vehicle includes vehicle sensors;
  a VRU bio-movement learning module that is included as a module of the VRU vehicle collision mitigation application that determines one or more biosignal parameters and physical movement parameters associated with the VRU, wherein the one or more biosignal parameters associated with the VRU include data pertaining to at least one of: a heart rate, a respiration rate, and a blood pressure associated with the VRU, wherein the one or more physical movement parameters associated with the VRU include data pertaining to a location and movement of the VRU, wherein determining the one or more biosignal parameters and the one or more physical movement parameters associated with the VRU includes determining exercise threshold values of the VRU, wherein it is determined if a requisite amount of biosignal parameter data and physical movement parameter data have been received to determine the exercise threshold values of the VRU, wherein upon determining that the requisite amount of biosignal parameter data and physical movement parameter data have been received, the biosignal parameter data and extracted velocity data of the VRU are aggregated to determine average biosignal parameter values while the VRU is moving at particular velocities;
  a VRU context determination module that is included as a module of the VRU vehicle collision mitigation application that determines a context of the VRU based on the one or more biosignal parameters and the physical movement parameters associated with the VRU;
  a vehicle physical movement determination module that is included as a module of the VRU vehicle collision mitigation application that determines one or more physical movement parameters associated with the vehicle, wherein the one or more physical movement parameters associated with the vehicle include data pertaining to a location and movement of the vehicle;
  a collision probability estimation module that is included as a module of the VRU vehicle collision mitigation application that estimates a probability of collision between the VRU and the vehicle based on the context of the VRU, the one or more physical movement parameters associated with the VRU, and the one or more physical movement parameters associated with the vehicle; and
  a human machine interface (HMI) output control module that is included as a module of the VRU vehicle collision mitigation application that provides a human machine interface output response based on the estimation of the probability of collision between the VRU and the vehicle, wherein the human machine interface output response is provided on at least one of the following: the head unit of the vehicle, the wearable device, and the portable device includes controlling a braking system of the vehicle to decelerate a speed of the vehicle in a manner that corresponds to the estimation of the probability of collision between the VRU and the vehicle.

11. The system of claim 10, wherein the VRU bio-movement learning module accesses at least one of: the biosignal sensors of the wearable computing device, the physical signal sensors of the wearable computing device, and the physical signal sensors of the portable device, wherein the biosignal sensors of the wearable computing device sense the one or more biosignal parameters associated with the VRU, the physical signal sensors of the wearable computing device sense the one or more physical movement parameters associated with the VRU, and the physical signal sensors of the portable device sense the one or more physical movement parameters associated with the VRU, wherein the one or more biosignal parameters and the one or more physical movement parameters are sensed and stored for a predetermined amount of time on at least one of: a storage unit of the wearable computing device and a storage unit of the portable device.

12. The system of claim 11, wherein the VRU bio-movement learning module determines the exercise threshold values of the VRU, wherein the exercise threshold values includes at least one of: a resting exercise threshold value, an active exercise threshold value, or a hyperactive exercise threshold value, wherein the exercise threshold values of the VRU are based on analyzing the one or more biosignal parameters associated with the VRU that are sensed and stored for the predetermined amount of time.

13. The system of claim 12, wherein the VRU bio-movement learning module determines velocity threshold values of the VRU, wherein the velocity threshold values includes at least one of: a resting velocity threshold value, a walking velocity threshold value, or a running velocity threshold value, wherein the velocity threshold values of the VRU are based on analyzing the one or more physical movement parameters associated with the VRU that are sensed and stored for the predetermined amount of time.

14. The system of claim 13, wherein the VRU context determination module receives one or more biosignal parameters and one or more physical movement parameters associated with the VRU in real time from at least one of: the biosignal sensors of the wearable computing device, the physical signal sensors of the wearable computing device, or the physical signal sensors of the portable device, wherein the VRU context determination module determines if the one or more biosignal parameters are greater than one or more of the exercise threshold values of the VRU and the VRU context determination module determines if the one or more physical movement parameters are greater than one or more of the velocity threshold values of the VRU, wherein a context of the VRU includes at least one of: a walking context, a running context, a biking context, or a passenger context.

15. The system of claim 14, wherein the collision probability estimation module determines an overlap between future expected positions of the VRU and future expected positions of the vehicle, wherein the future expected positions of the VRU are determined by analyzing one or more physical movement parameters associated with the VRU in real time, wherein the future expected positions of the vehicle are determined by analyzing one or more physical movement parameters associated with the vehicle in real time.

16. The system of claim 15, wherein the collision probability estimation module evaluates the context of the VRU, a velocity of the VRU in real time, and a velocity of the vehicle in real time with respect to the determined overlap between the future expected positions of the VRU and the future expected positions of the vehicle.

17. The system of claim 15, wherein the collision probability estimation module evaluates one or more collision probability factors to determine a probability that the overlap of estimated future expected positions will result in a collision and a predicted timeframe at which the VRU and the vehicle may collide.

18. The system of claim 10, wherein the HMI output control module controls the human machine interface output response to provide an output response that correspond to the adjusted estimated portability of collision between the VRU and the vehicle, wherein the human machine interface output response includes a warning provided through a display device, an audio device, or a haptic device within the vehicle.

19. A non-transitory computer-readable storage medium storing instructions that when executed by a processor of a computer, causes the processor of the computer to implement a method perform actions, comprising:

determining one or more biosignal parameters and one or more physical movement parameters associated with a vulnerable road user (VRU), wherein the one or more biosignal parameters associated with the VRU include data pertaining to at least one of: a heart rate, a respiration rate, and a blood pressure associated with the VRU, wherein the one or more physical movement parameters associated with the VRU include data pertaining to a location and movement of the VRU, wherein determining the one or more biosignal parameters and the one or more physical movement parameters associated with the VRU includes determining exercise threshold values of the VRU, wherein it is determined if a requisite amount of biosignal parameter data and physical movement parameter data have been received to determine the exercise threshold values of the VRU, wherein upon determining that the requisite amount of biosignal parameter data and physical movement parameter data have been received, the biosignal parameter data and extracted velocity data of the VRU are aggregated to determine average biosignal parameter values while the VRU is moving at particular velocities;

determining a context of the VRU based on the one or more biosignal parameters and one or more physical movement parameters associated with the VRU;

determining one or more physical movement parameters associated with a vehicle, wherein the one or more physical movement parameters associated with the vehicle include data pertaining to a location and movement of the vehicle;

estimating a probability of collision between the VRU and the vehicle based on the context of the VRU, the one or more physical movement parameters associated with the VRU, and the one or more physical movement parameters associated with the vehicle; and providing a human machine interface output response based on the estimation the of probability of collision between the VRU and the vehicle, wherein the human machine interface output response is provided on at least one of the following: a head unit of the vehicle, a wearable device, and a portable device includes controlling a braking system of the vehicle to decelerate a speed of the vehicle in a manner that corresponds to the estimation of the probability of collision between the VRU and the vehicle.

20. The non-transitory computer readable storage medium of claim 19, wherein estimating the probability of collision between the VRU and the vehicle includes determining an overlap between future expected positions of the VRU and future expected positions of the vehicle and evaluating the context of the VRU, a real time velocity of the VRU, and a real time velocity of the vehicle with respect to a determined overlap between the future expected positions of the VRU and the future expected positions of the vehicle.

* * * * *